United States Patent
Arnold

(10) Patent No.: US 9,589,175 B1
(45) Date of Patent: Mar. 7, 2017

(54) ANALYZING INTEGRAL IMAGES WITH RESPECT TO HAAR FEATURES

(71) Applicant: Amazon Technologies, Inc., Seattle, WA (US)

(72) Inventor: Vaughn Todd Arnold, Scotts Valley, CA (US)

(73) Assignee: Amazon Technologies, Inc., Seattle, WA (US)

( * ) Notice: Subject to any disclaimer, the term of this patent is extended or adjusted under 35 U.S.C. 154(b) by 14 days.

(21) Appl. No.: 14/501,665

(22) Filed: Sep. 30, 2014

(51) Int. Cl.
G06K 9/56 (2006.01)
G06K 9/00 (2006.01)
G06T 5/00 (2006.01)

(52) U.S. Cl.
CPC .......... *G06K 9/00234* (2013.01); *G06T 5/005* (2013.01); *G06T 2207/20021* (2013.01)

(58) Field of Classification Search
CPC G06T 3/00; G06T 3/40; G06T 3/4007; G06T 7/004; G06T 7/0044; G06T 7/0079; G06T 7/0081; G06T 15/10; G06T 2207/10004; G06T 2207/20021; G06T 2207/30201; G06T 5/005; G06K 9/00221; G06K 9/00228; G06K 9/002
See application file for complete search history.

(56) References Cited

U.S. PATENT DOCUMENTS

| | | | |
|---|---|---|---|
| 7,003,176 B1 | 2/2006 | Suzuki et al. | |
| 7,123,277 B2 | 10/2006 | Brown Elliott et al. | |
| 7,180,528 B2 | 2/2007 | Bossut et al. | |
| 7,379,613 B2 | 5/2008 | Dowski, Jr. et al. | |
| 7,398,378 B2 | 7/2008 | Sugure et al. | |
| 7,583,859 B2 | 9/2009 | Suzuki et al. | |
| 7,688,335 B2 | 3/2010 | Brown Elliott et al. | |
| 8,169,656 B2 | 5/2012 | Kondo et al. | |
| 2009/0290791 A1 | 11/2009 | Holub et al. | |
| 2010/0053368 A1 | 3/2010 | Nanu et al. | |
| 2010/0054592 A1* | 3/2010 | Nanu | G06T 5/008 382/167 |
| 2011/0102643 A1 | 5/2011 | Nanu et al. | |
| 2011/0211233 A1* | 9/2011 | Yokono | G06K 9/00973 358/474 |
| 2011/0268319 A1* | 11/2011 | Niskanen | G06K 9/4609 382/103 |
| 2012/0120283 A1* | 5/2012 | Capata | G06K 9/00255 348/241 |
| 2012/0195495 A1* | 8/2012 | Shiell | G06K 9/00275 382/159 |
| 2013/0272575 A1* | 10/2013 | Li | G06K 9/4671 382/103 |

* cited by examiner

Primary Examiner — Samir Ahmed
(74) Attorney, Agent, or Firm — Lee & Hayes, PLLC

(57) ABSTRACT

Subject matter disclosed herein relates to arrangements and techniques that provide for identifying objects within an image such as the face position of a user of a portable electronic device. An application specific integrated circuit (ASIC) is configured to locate objects within images. The ASIC includes an image node configured to process an image and a search node configured to search the image for an object in the image. The search node includes an integral image generation unit configured to generate an integral image of the image and a Haar feature evaluation unit configured to evaluate search windows of the integral image with respect to Haar-like features. The ASIC also includes an ensemble node configured to confirm the presence of the object in the image.

19 Claims, 20 Drawing Sheets

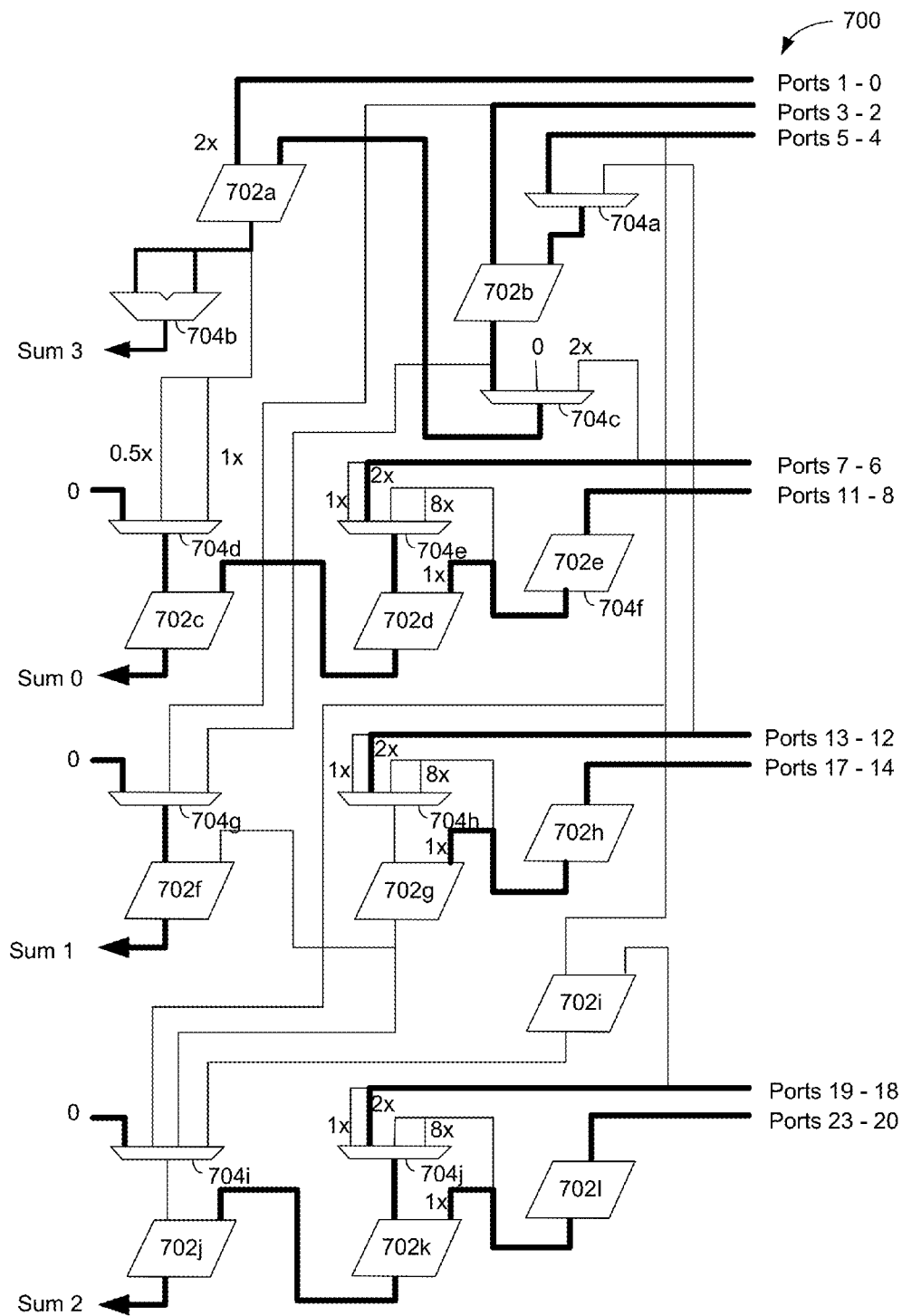
FIG. 7B (FEATURE TYPE I)

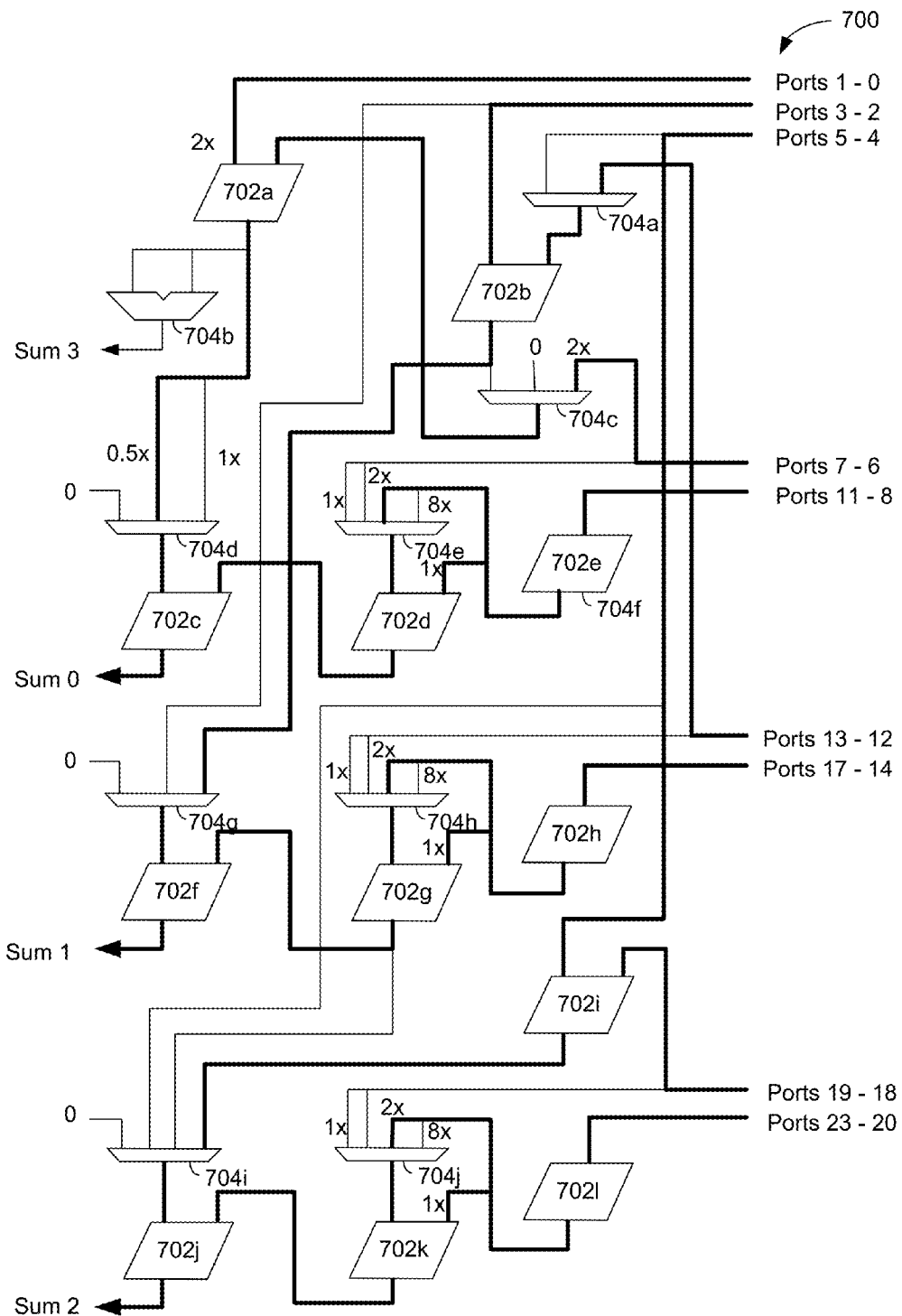
FIG. 7C (FEATURE TYPE II)

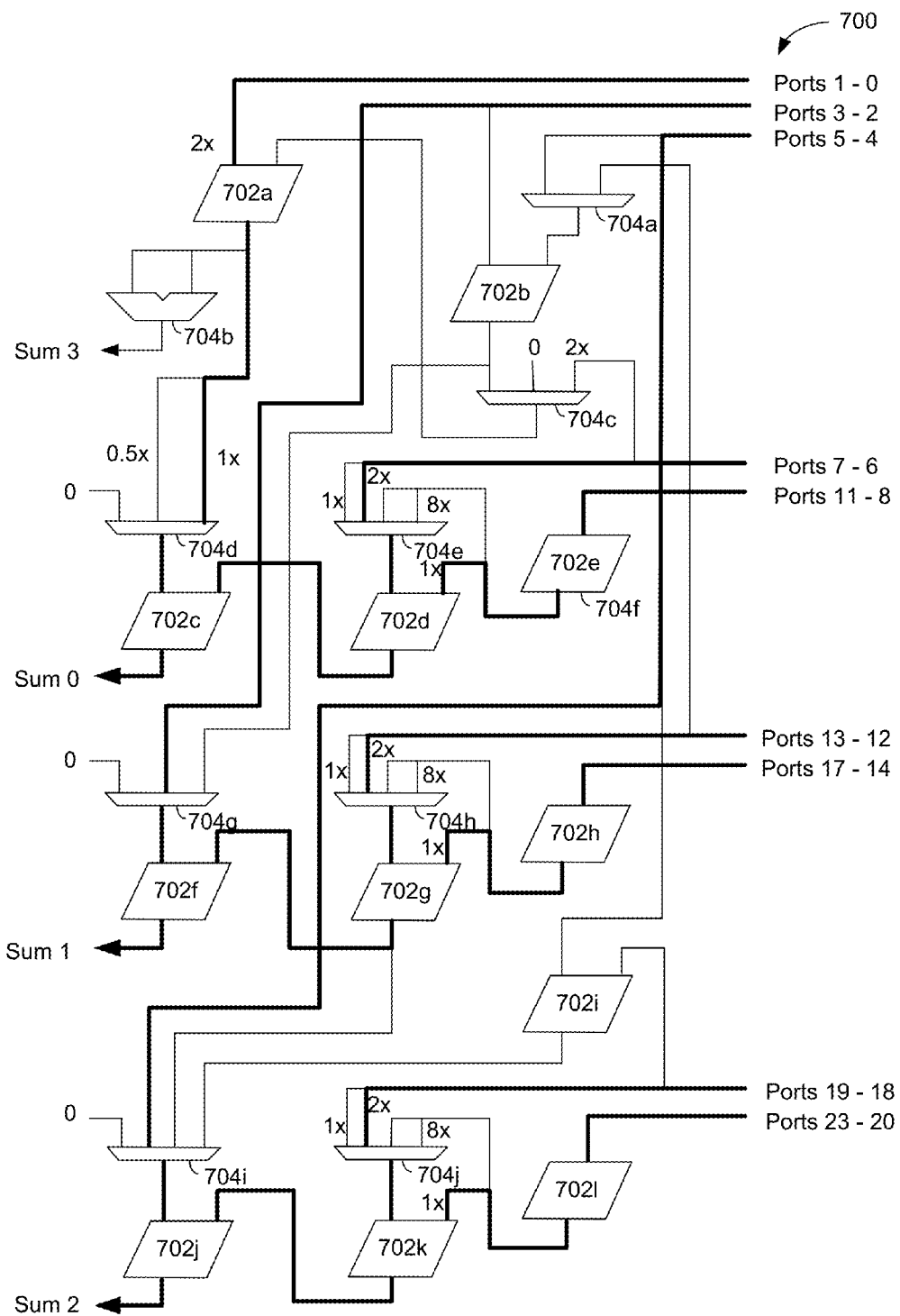
FIG. 7D (FEATURE TYPE III)

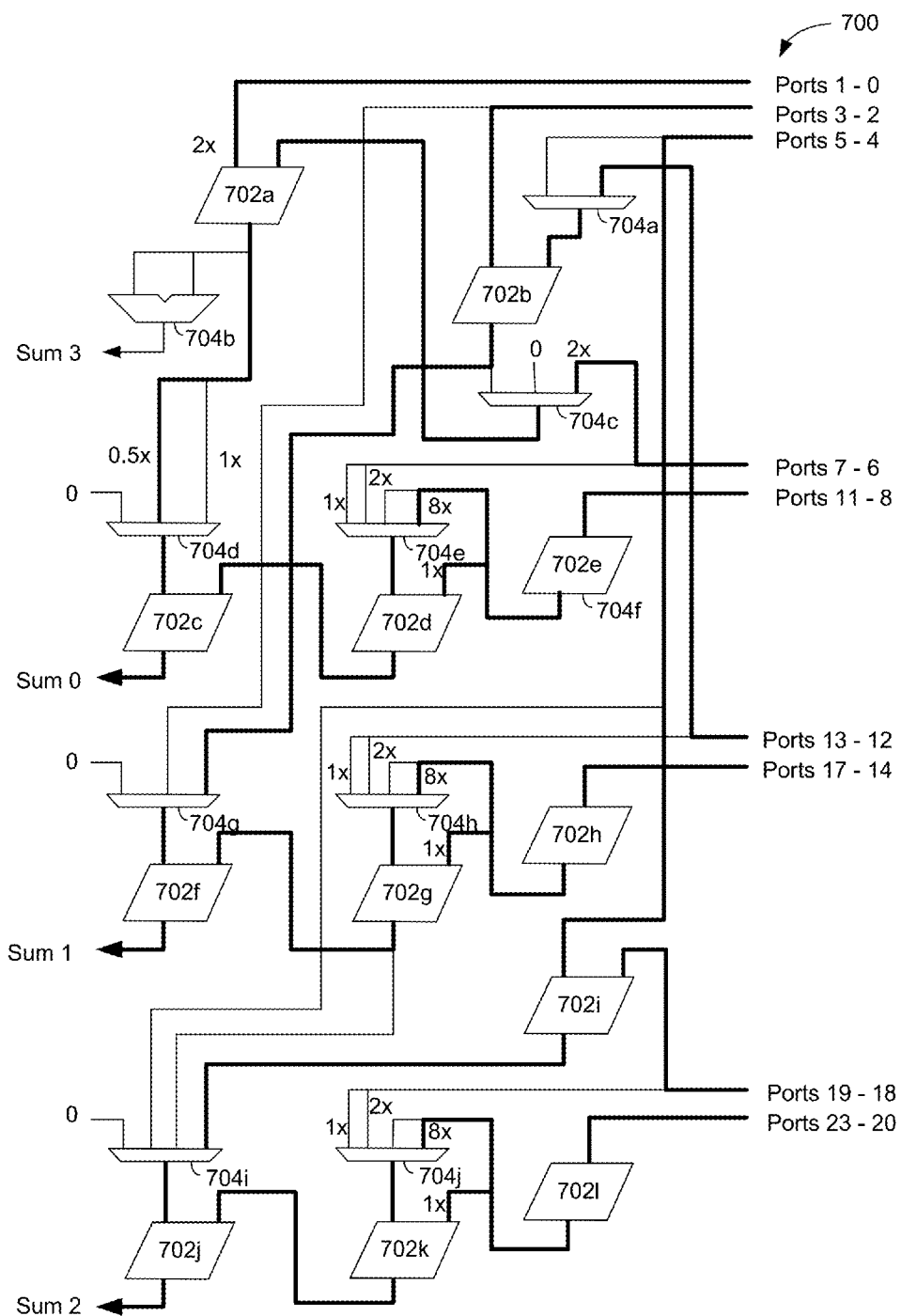
FIG. 7E (FEATURE TYPE IV)

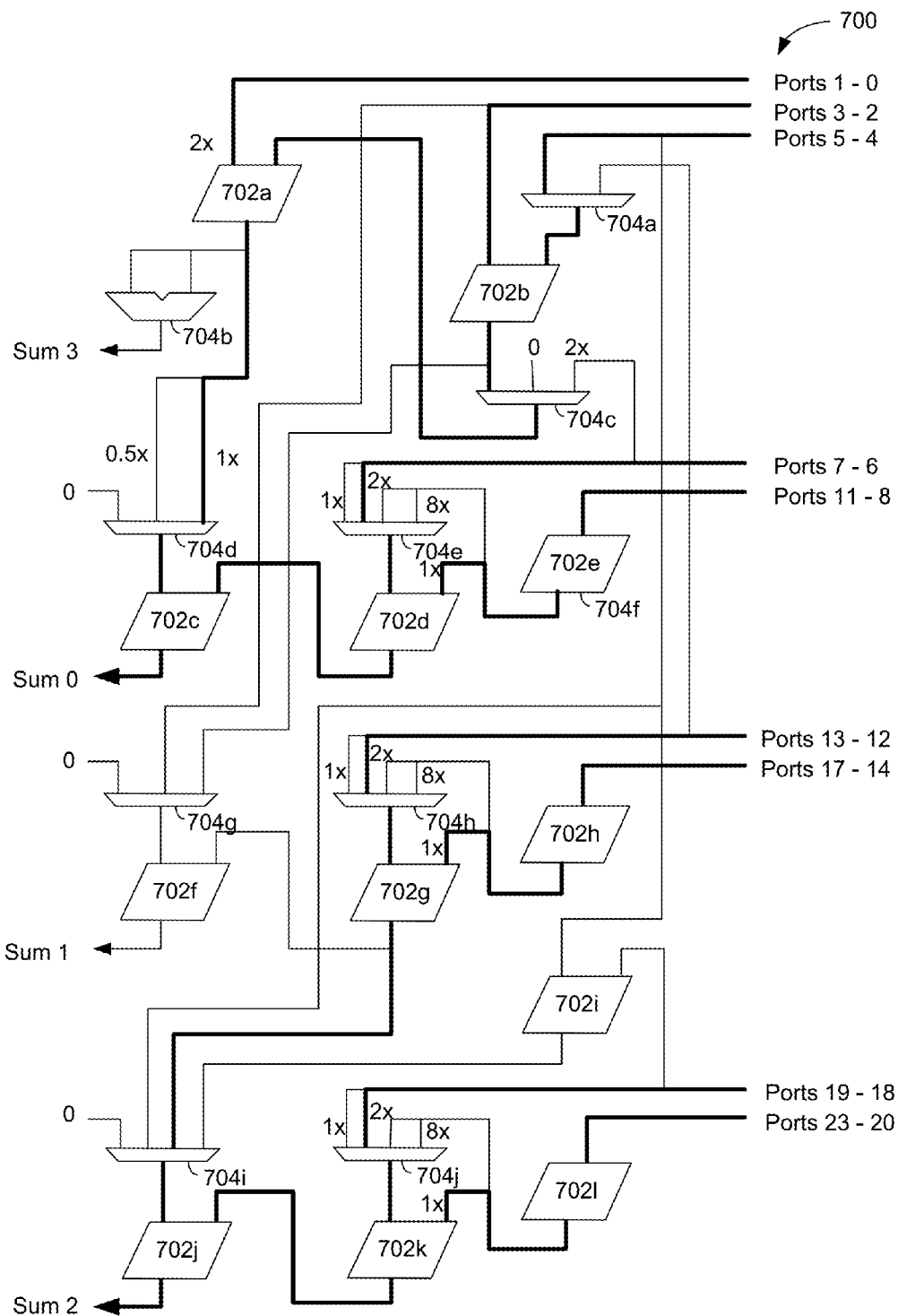
FIG. 7F (FEATURE TYPE V)

ANALYZING INTEGRAL IMAGES WITH RESPECT TO HAAR FEATURES

BACKGROUND

Many portable or stationary electronic devices are becoming more complex and using various technologies for controlling the portable electronic devices as well as for providing various user functionality and interactions. The implementation of these complex technologies and the processing associated therewith can require a large amount of resources from the portable electronic device's application processor and/or central processing unit (CPU). Such processing requirements can result in slower performance by the portable electronic device, greater power requirements, and/or the need for larger and more powerful processors for the portable electronic device.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

FIGS. 7A-7F schematically illustrate examples of a circuit for implementing a Haar feature evaluation module corresponding to a feature evaluate block of the arrangement of FIG. 6, in accordance with various embodiments.

DETAILED DESCRIPTION

Figure 1:
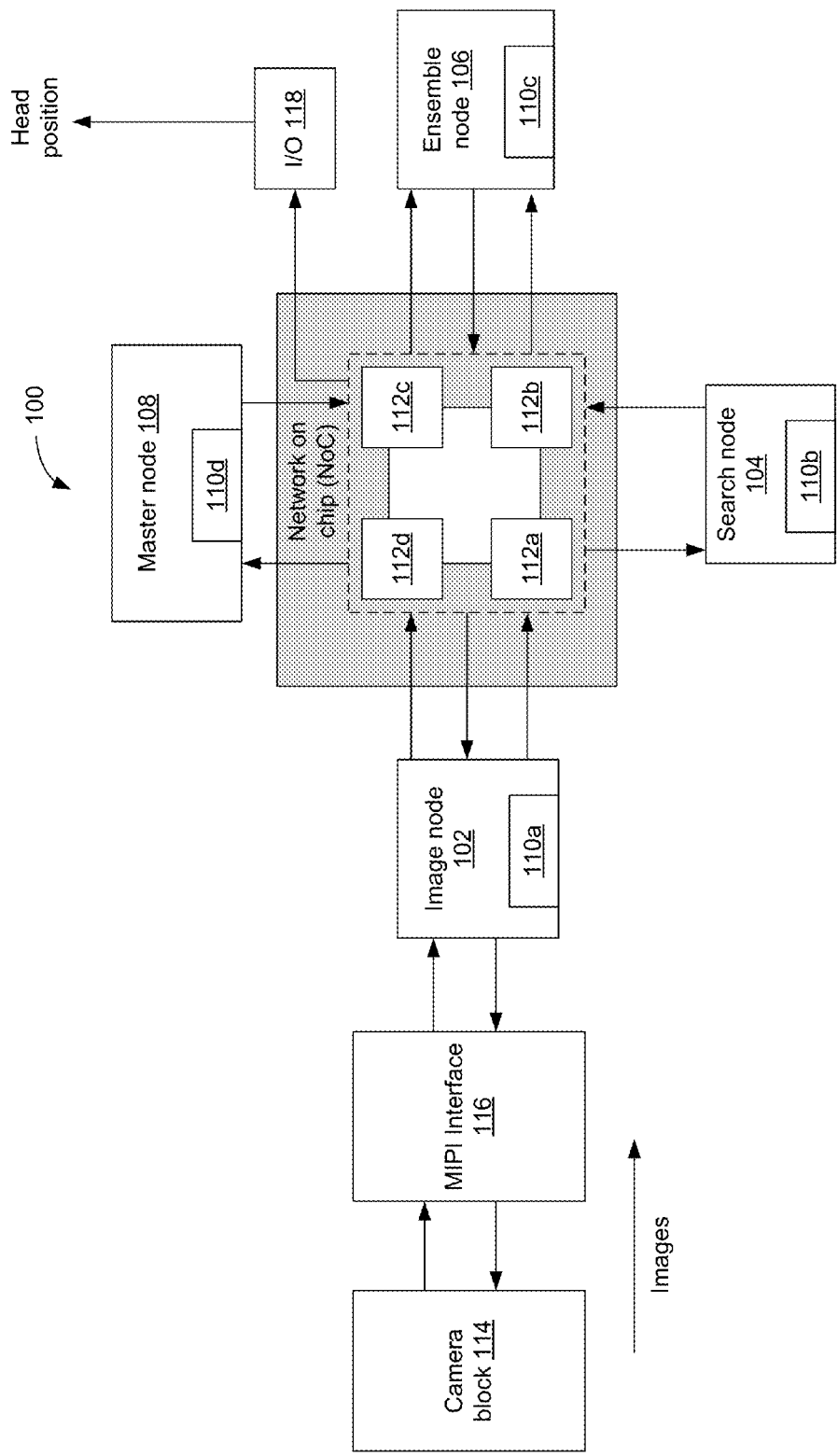
FIG. 1 schematically illustrates an Application Specific Integrated Circuit (ASIC), in accordance with various embodiments.

The present application provides arrangements and techniques for identifying objects within an image such as the face position of a user of a portable electronic device. More particularly, the present disclosure provides an Application Specific Integrated Circuit (ASIC) that identifies the position of a user's face, verifies a position of the user's face and then provides the position of the user's face to the application processor (AP) of the portable electronic device for use by the AP.

A portable electronic device such as, for example, a smartphone, a tablet computing device, a notebook computing device, etc., generally displays content on a display. The content can include, for example, images, words, etc. Such content can be displayed to a user for viewing. When the user is ready to move on to further content, the user can "scroll" the content on the display to new content. Often, the user scrolls the content on the display via, for example, by contacting the display (e.g., a touchscreen display), or physical inputs such as a keyboard, a toggle switch, a mouse pad type device, etc. However, technology has now been developed and used to allow for the portable electronic device to recognize an image of a portion of the user and track that portion of the user for movement that can be used by the portable electronic device to signify a desire to scroll content displayed on the display of the portable electronic device. For example, an image of the position of a user's face can be tracked by cameras on the portable electronic device to thereby signify desired movement of scrolling of the content on the display. For example, the cameras may track the user's face to determine that the user's face is moving in an upward motion, thereby indicating that the user wishes the content on the display to scroll upward to provide further content on the display. Likewise, the cameras can track movement of the user's face in a downward or side-to-side movement to indicate a desire for the user to have content scrolled in a downward motion on the display or in a side-to-side motion. However, such processing requires a great deal of power and time on the part of the application processor for the portable electronic device.

In accordance with various embodiments, the NoC included with a portable electronic device includes three nodes for processing and identifying images corresponding to a position of a user's face. The NoC includes an image node that receives images from four corner cameras. The four corner cameras are generally located in the four corners of a display of the portable electronic device. In accordance with various embodiments, only two of the four images are utilized by the image node since often, one or two of the cameras are occluded by the user's fingers. Furthermore, as will become apparent herein, only two images are generally needed for identifying a position of the user's face. The other two images, and thus a total of four images, can be utilized to calibrate the four corner cameras of the portable electronic device. The image node processes the two images so that the two images can be searched for a user's face. The processing can include exposure correction in the form of a black level correction, defective pixel correction, and a statistical analysis of the images.

Once the image node has processed the two images, generally a left image and a right image, the two images are forwarded to a search node. The search node generally scales the image down such that a minimum size of an object of interest, such as the user's face, can fit within a search window. The search node then searches for the user's face within a first image. Once the search node determines that it has found the user's face within a region of interest, the search node searches the second image in order to determine if the face can be found in a similar region of interest within the second image.

The search node will progressively search within the first image and will continue to scale the first image down such that a maximum size of the item of interest, such as the user's face, will fit within a search window. In accordance with various embodiments, the search node includes a cascade classifier that contains stages of Haar features that are trained to identify a particular object or pattern. The searching of the various regions within the images progresses through the various stages of the cascade classifier until either a stage fails, or a region of interest in the image passes all of the stages, thereby indicating the presence of an object such as the user's face. The downsizing and searching of the image continues until a location of the object within the image can be determined.

Once the search node has identified the presence of a face in both the right and left images, the image is sent to an ensemble node of the ASIC. The ensemble node is utilized to confirm the presence and size of the face in a region of interest in the first image and a corresponding region of interest in the second image. In accordance with various embodiments, a template is utilized by the ensemble node to compare, pixel-by-pixel, the region of interest in the first image and, pixel-by-pixel, the region of interest in the second image. If the ensemble node confirms the presence and size of a face in the two images, then the image of the face is sent back to the search node to extract facial features from the face. The features from the face are then forwarded to the application processor which will then analyze the features of the face to determine positions of the face in order to control the scrolling.

FIG. 1 schematically illustrates an Application Specific Integrated Circuit (ASIC) 100 that includes four nodes 102, 104, 106 and 108. The four nodes 102, 104, 106 and 108 include an image node 102, a search node 104, an ensemble node 106 and a master node 108. The ASIC 100 includes four scaler Microprocessor without Interlocked Pipeline Stages (MIPS) cores 110a, b, c and d and four megabytes of internal memory 112a, b, c and d arranged as a Network on Chip (NoC). In accordance with various embodiments, the internal memory is static random access memory (SRAM). More or less memory may be included if desired. The ASIC 100 further includes a low speed input/output unit 114. As can be seen, the four processor cores 110a, b, c and d are associated with one of the nodes 102, 104, 106 and 108, respectively. Each memory 112a, b, c and d is also generally associated with one of the four nodes 102, 104, 106 and 108.

The master node 108, serves as "the command and control block" for the ASIC 100. The master node 108 is responsible for boot and power management, as well as controlling the three other MIPS processor cores 110a, b and c in the ASIC 100.

As can be seen, the image node 102 is in communication with the four corner cameras, represented by a camera block 114 via a Mobile Industry Processor Interface (MIPI) interface 116. A low speed input output (I/O) 118 is in communication with an application processor (not illustrated) of a portable electronic device (not illustrated) that includes the ASIC 100.

Figure 2:
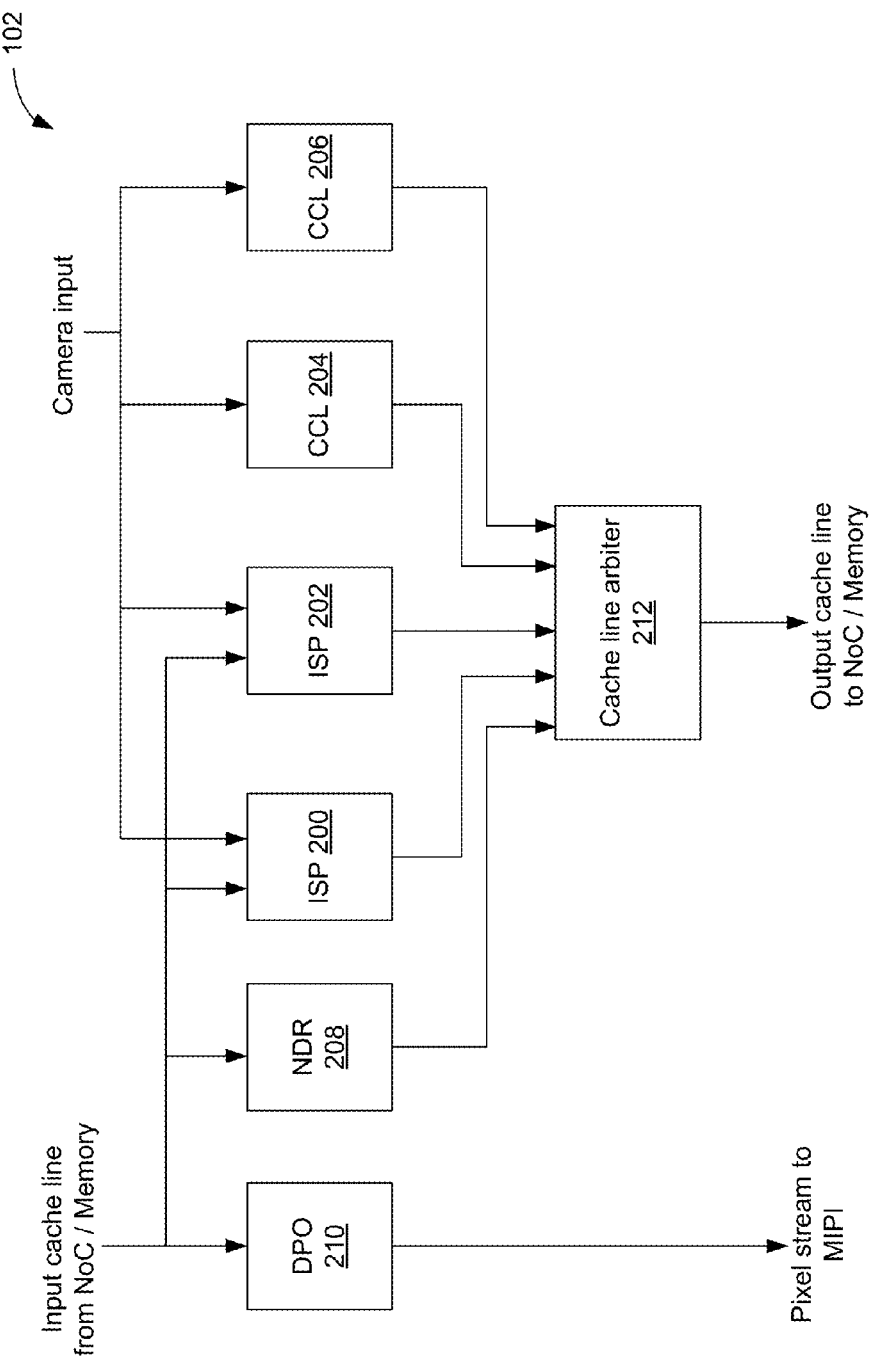
FIG. 2 schematically illustrates an image node of the ASIC of FIG. 1, in accordance with various embodiments.

FIG. 2 schematically illustrates the image node 102. The image node 102 includes two image sensor processors (ISP) 200, 202 and two camera calibration logic (CCL) 204, 206. The ISPs 200, 202 and the CCLs 204, 206 are in communication with the MIPI interface 116 that is in communication with the four corner cameras (camera block 114). The image node 102 also includes a 90 degree rotate (NDR) 208, and a debug port output (DPO) 210. The CCLs 204, 206 and the DPO 210 are utilized for calibration of the four corner cameras (in conjunction with the ISPs 200, 202). The calibration of the four corner cameras is performed by the AP and will not be discussed further herein. However, the calibration of the four corner cameras is important so that a relative position of a region of interest (ROI) in one camera translates to a maximally bounded corresponding ROI in another camera based on estimated z-depth. Specifically, the uncertainty in the size and position of the ROI in the second camera should be a function primarily of the uncertainty in the z-depth estimation and not the uncertainty of the two cameras in global coordinate space. The image node 102 also includes buffers (not illustrated). The image node 102 also includes a cache line arbiter 212.

The NDR 208 is utilized since often the user may be using the portable electronic device in a "landscape" mode. In such an instance, images arriving from the cameras may actually be on their sides. Thus, the NDR 208 can be utilized to rotate the images based upon an indication that the portable electronic device is being operated in a landscape mode. In accordance with various embodiments, the NDR 208 is configured to rotate the images 90 degrees, 180 degrees and 270 degrees.

Each ISP 200, 202 provides functionality that includes static and dynamic defective pixel detection and correction, black-level correction and gain control, and full and partial image statistical generation and analysis. Generally, the primary processing is to the camera exposure control. These are latency critical adjustments, so dedicated hardware is included to statistically analyze the full input images over one of several specified regions of interest (ROI) in the image. Camera adjustments can be based on the entire image or can be made to track ROIs corresponding to tracking or potential face positions. Local black level correction also facilities search retrying of images corrected based on different regions (if new images are not available yet due to low frame rate). The image statistical generation and analysis can be used for normalization of matching thresholds.

Generally, the ISPs 200, 202 receive a signal that a frame is coming in and then moves the frame through the ISPs 200, 202 to process the images. The processed images can then be written to memory 112a or can be provided to another node within the ASIC 100.

Figure 3:
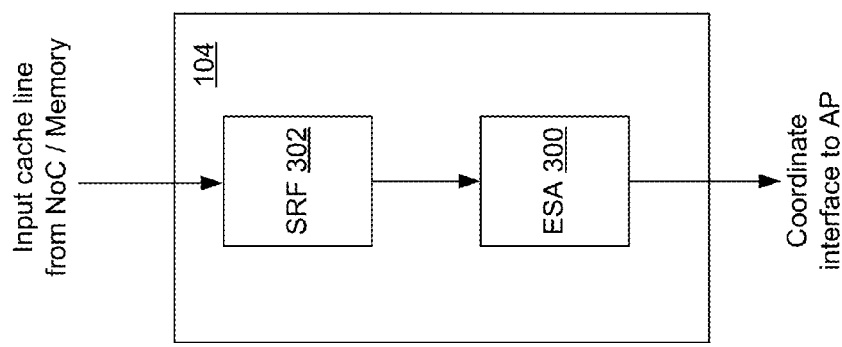
FIG. 3 schematically illustrates a search node of the ASIC of FIG. 1, in accordance with various embodiments.

FIG. 3 schematically illustrates the search node 104. The search node 104 includes an exhaustive search array unit (ESA) 300 and a scaling resample filter (SRF) 302. The ESA 300 and the SRF 302 are controlled by the MIPS core 110b.

The SRF 302 is designed to resample an image while downsizing it. In accordance with various embodiments, the SRF 302 is a six tap programmable scaler. The coefficients are programmable, so various types of filters can be implemented. In accordance with various embodiments, Lanczos resampling coefficients are used and the maximum downscale is approximately one-sixth.

Once the image is scaled down, the image is ready to be searched for objects. Search processing by the ESA 300 largely involves passing a search window over the image until the entire scaled image has been searched. An individual window is searched by applying and testing each stage of a cascade classifier until a stage fails or all stages are passed. If all stages pass, then an object is determined to have been found in the image and its coordinates and dimensions are saved. Generally, the process is then repeated for a second image related to the first image, i.e. the stereo image of the first image, to check if the object is also located at the same coordinates and with the same dimensions in the second image. Searching of the second image can also be done simultaneously with searching the first image if desired.

More particularly, it is possible to search a full size image, which in accordance with various embodiments, is approximately 400×400 pixels. However, the search window, in accordance with various embodiments, is generally 32×32 pixels. Since a minimum size for an object, e.g., the user's face, is 50×50, the image generally needs to be scaled down until the minimum size of the object fits within the 32×32 image. Thus, the original 400×400 image is generally scaled down to 256×256. The entire image is searched by passing the search window over the scaled down image, generally beginning at location 0, 0 of the image. The scaled image is generally saved and if the initial searching passes the stages, then the image is further scaled down and searched until the image has been scaled down to a point that the maximum object size, e.g., 220×220 for a user's face, fits within a 32×32 search window. The image is scaled by a programmable factor with a default of 1.2 each iteration.

The search implementation utilizes Haar Evaluator type features based upon the Viola-Jones algorithm. The Haar features are combinations of 2 or 3 rectangular shapes. These shapes can be compared and tested against a threshold, and this yields useful information regarding the presence of a face or facial features in the current search window. Generally the Haar features and the Viola-Jones algorithm are very efficient at indicating when an object is not present within an image. The rectangular shapes of the Haar features are computed by adding up pixel values of all of the pixels in the given rectangle. This can generally be accomplished very quickly for any arbitrarily sized rectangle if an "integral image" of a given input image is computed ahead of time.

As is known, in order to create an integral image, each pixel is assigned a value that is equivalent to the sum of all the pixels to the upper left of the location of the pixel. More particularly, the integral image is a version of the input image where each pixel is replaced by the value of all of the pixels to the left and above the given pixel location in the input image. Thus, as can be seen in FIG. 4A, a target pixel 402 of an image 400 is assigned a value equal to all of the pixels in the integral area 404. Note that the integral image is one pixel wider and higher than the input image (additional row/column 406). Further note that the pixel at location [w, h] contains the total of all of the pixels in the entire image 400.

Figure 4B:
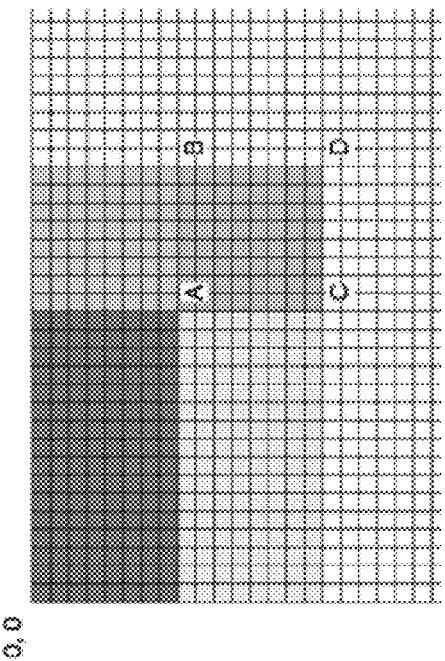
FIGS. 4A and 4B schematically illustrate integral images for pixels of an image.
Figure 4A:
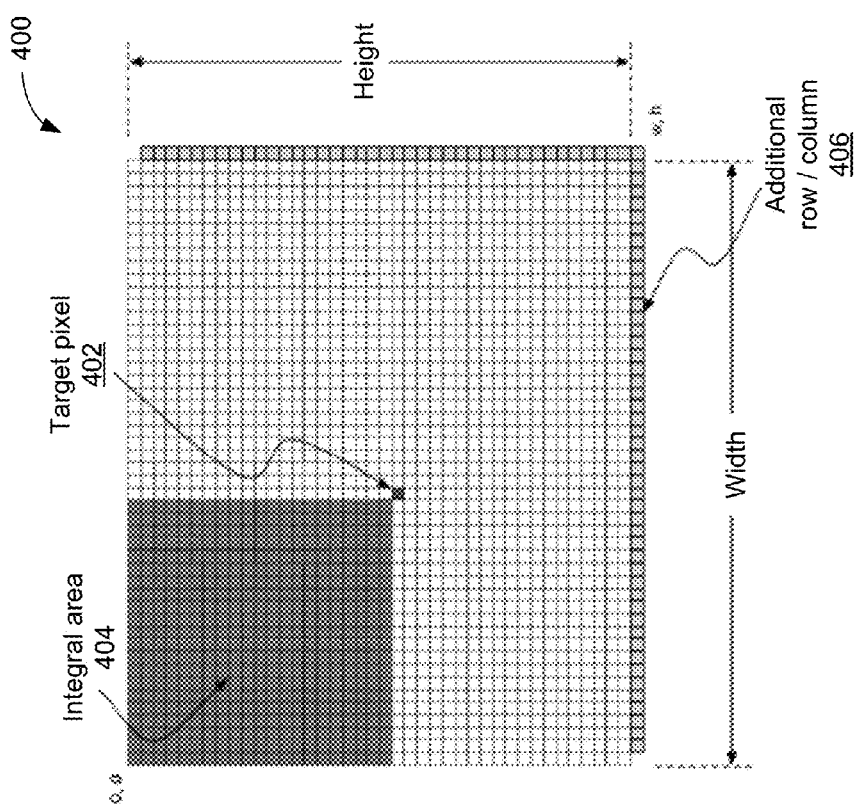

Referring to FIG. 4B, given an integral image, the pixel total of any rectangle in an image can be quickly computed by adding and subtracting the integral images (II) of the four pixels at the corners A, B, C and D of the rectangle. However, it can be seen in FIG. 5 that when integral image pixels B and C are subtracted from integral image pixel D, the integral image pixel A is subtracted off twice. Thus, the area is given by: Rect(A, B, C, D)·area=II(D)−II(C)−II(B)+II(A).

Figure 5:
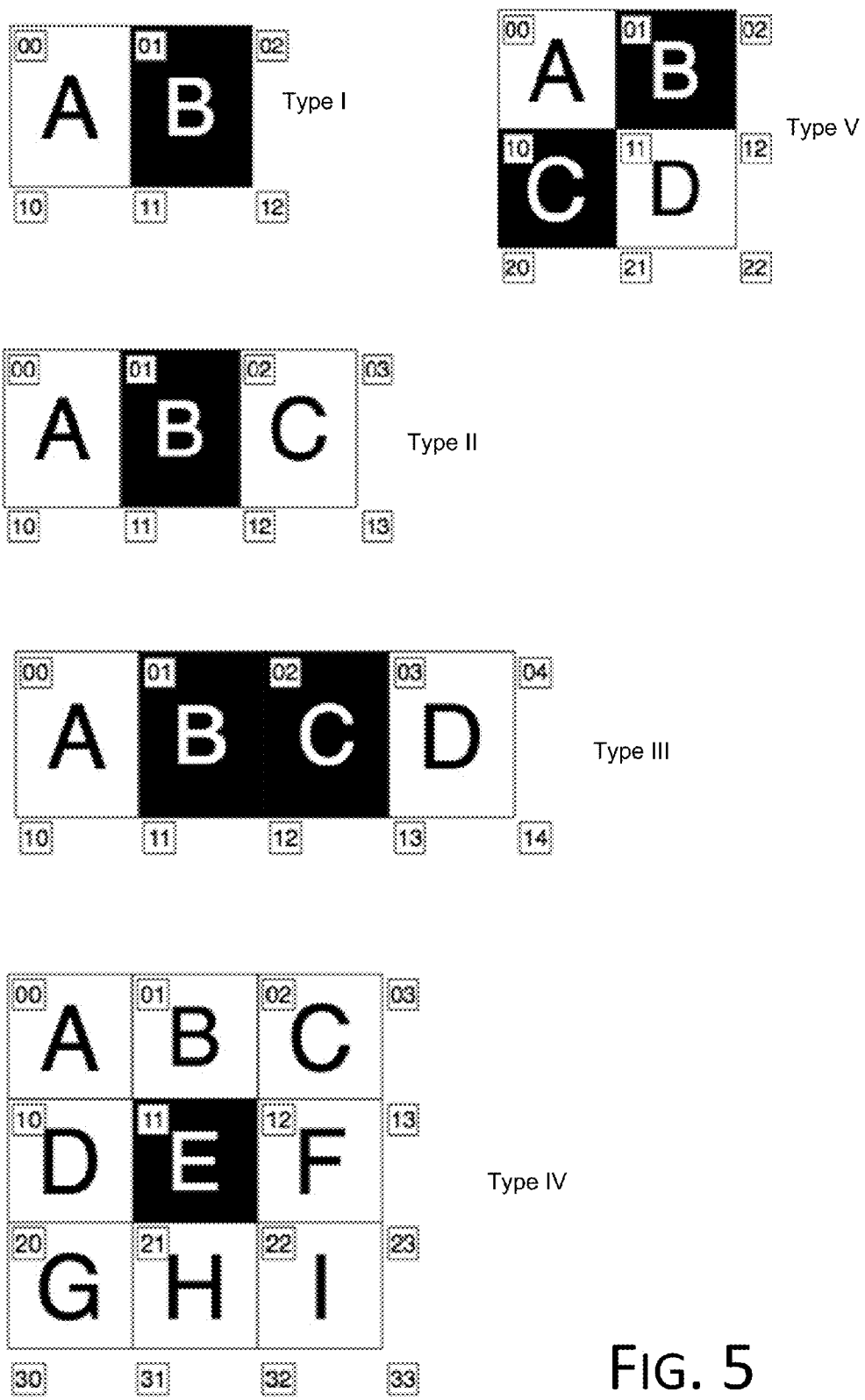
FIG. 5 schematically illustrates examples of Haar features that are used with an exhaustive search array of the search node of FIG. 3.

As previously noted, Haar features are weighted combinations of 2 or 3 rectangles. FIG. 5 illustrates examples of Haar features that are based on the Haar features illustrated in Table 1 below and that are used with the ESA 300 of FIG. 3. Note that the white rectangles are assumed to cover the entire feature (including the area under the black rectangle), and each rectangle has an area weight associated with it. The weights in Table 2 below are for the black rectangles. The white rectangles always have a multiplier of −1.

TABLE 1

1. Edge features
(a)  (b)

2. Line features
(a)  (b)  (c) (d)

3. Center-surround features
(a)

4. Special diagonal line feature

TABLE 2

| Type | ID | Rect's | Tilted | Weight |
| --- | --- | --- | --- | --- |
| Edge | a | 2 | No | 2 |
|  | b | 2 | No | 2 |
| Line | a | 2 | No | 3 |
|  | b | 2 | No | 2 |
|  | c | 2 | No | 3 |
|  | d | 2 | No | 2 |
| Center | a | 2 | No | 9 |
| Diagonal | a | 3 | No | 2 |

As can be seen in FIG. 5, there are four Haar features that are unique and not simply just a new orientation. Those are Haar features 1a, 2a, 2b, and 3a. These Haar features are further referred to herein as type I, II, III and IV, respectively. A fifth Haar feature is also included as type V.

The type I Haar feature evaluation summation is computed using the following weights and expression:

$$\text{sum}(TI) = 2*[B] - ([A] + [B])$$

$$\text{sum}(TI) = 2(C_{12} - C_{11} - C_{02} + C_{01}) - (C_{12} - C_{10} - C_{02} + C_{00})$$

$$\text{sum}(TI) = C_{12} - 2C_{11} - C_{02} + 2C_{01} + C_{10} - C_{00}$$

This is the resulting 6-term addition that must be implemented for the type I Haar feature. The C reference refers to the corner pixel location. The 90-degree rotated version of the type I Haar feature operates on the transposed feature (mirrored about the x=y axis). Thus the sum for the transposed type I Haar feature is written by simply reversing the indices on each of the corners:

$$\text{sum}(TI^T) = C_{21} - 2C_{11} - C_{20} + 2C_{10} + C_{01} - C_{00}$$

The Haar type II feature evaluation summation is computed using the following weights and expression:

$$\text{sum}(TII) = 3*[B] - ([A] + [B] + [C])$$

$$\text{sum}(TII) = 3(C_{12} - C_{11} - C_{02} + C_{01}) - (C_{13}C_{10}C_{03} + C_{00})$$

$$\text{sum}(TII) = 2C_{12} - 2C_{11} - 2C_{02} + 2C_{01} + C_{12} - C_{11} - C_{02} + C_{01} - C_{13} + C_{10} + C_{03} - C_{00}$$

This is the resulting 12-term addition that must be implemented for the type II Haar feature. The sum for the transposed (or rotated) version of Haar type II feature is simply:

$$\mathrm{sum}(TII^T) = 2C_{21} - 2C_{11} - 2C_{20} + 2C_{10} + C_{21} - C_{11} - C_{20} + C_{10} - C + C_{01} + C_{30} - C_{00}$$

The type III Haar feature evaluation summation is computed using the following weights and expression:

$$\mathrm{sum}(TIII) = 2*([B]+[C]) - ([A]+[B]+[C]+[D])$$

$$\mathrm{sum}(TIII) = 2*(C_{13} - C_{11} - C_{03} + C_{01}) - (C_{14} - C_{10} - C_{04} + C_{00})$$

$$\mathrm{sum}(TIII) = 2C_{13} - 2C_H - 2C_{03} + {}^2C_{01}C_{14} + C_{10} + C_{04}C_{00}$$

This is the resulting 8-term addition that must be implemented for the type III Haar feature. The sum for the transposed (or rotated) version of the type III Haar feature is simply:

$$\mathrm{sum}(TIII^T) = 2C_{31} - 2C_{11} - 2C_{30} + 2C_{10}C_{41} + C_{01} + C_{40}C_{00}$$

The type IV Haar feature evaluation summation is computed using the following weights and expression:

$$\mathrm{sum}(TIV) = 9*[E] - ([A]+[B]+[C]+[D]+[F]+[G]+[H]+[I])$$

$$\mathrm{sum}(TIV) = 9*(C_{22} - C_{21} - C_{12} + C_{11}) - (C_{33}C_{30}C_{03} + C_{00})$$

$$\mathrm{sum}(TIV) = 8C_{22} - 8C_{21} - 8C_{12} + 8C_{11} + C_{22} - C_{21} - C_{12} + C_{11} - C_{33} + C_{30} + C_{03} - C_{00}$$

This is the resulting 12-term addition that must be implemented for the type IV Haar feature. This type of feature is radially symmetric, so it has no transpose orientations.

The type V Haar feature evaluation summation is computed using the following weights and expression:

$$\mathrm{sum}(TV) = 2*([B]+[C]) - ([A]+[B]+[C]+[D])$$

$$\mathrm{sum}(TV) = 2*(C_{12} - C_{11} - C_{02} + C_{01} + C_{21} - C_{20} - C_{11} + C_{10}) - (C_{22} - C_{20} - C_{02} + C_{00})$$

$$\mathrm{sum}(TV) = 2C_{12} - 4C_{11} - C_{02} + 2C_{01} + 2C_{21} - C_{20} + 2C_{10} - C_{22} - C_{00}$$

This is the resulting 9-term addition that must be implemented for the type V Haar feature.

Figure 6:
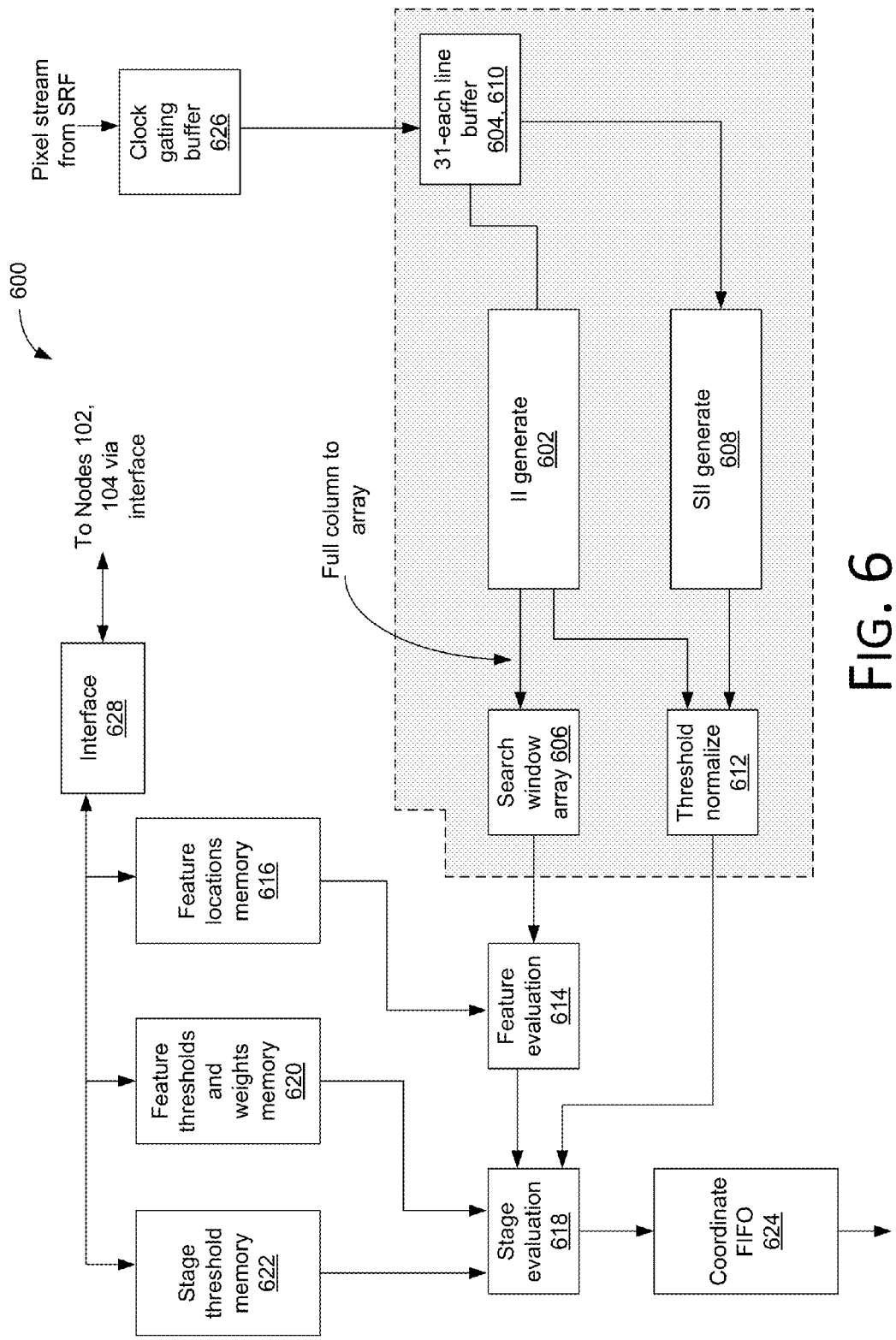
FIG. 6 schematically illustrates an arrangement of part of the exhaustive search array of the search node of FIG. 3, in accordance with various embodiments.

Referring to FIG. 6, an arrangement 600 of part of the ESA 300 of FIG. 3 is schematically illustrated. Generally, the ESA 300 is configured for a complete 32×32 search window array of pixels in parallel. The ESA 300 does this continually for every possible location of the search window.

An integral image (II) pixel II is only partially computed at an II generate module 602 to minimize a pixel width of a line buffer 604. Rather than computing the full integral image pixel, only integral columns are computed. As the columns are read from the line buffer 604 to fill a two dimensional (2D) search window array 606, the full integral pixel is computed by adding a new column to the last column of the actual integral image pixel concatenated to the search window array 606.

In addition to the II previously discussed, a second integral image called the Squared Integral Image (SII) is also generated at a SII generate module 608. The SII is used to compensate Haar feature thresholds by the reciprocal of the standard deviation. These special integrated images SII are stored into a line buffer 610 such that a larger 2D array of pixels can be formed and accessed. This is necessary for both the II and SII frames; however only the II is used to feed the search window array 606.

A threshold normalization block 612 requires the pixel total and the squared pixel total for a current search window. Thus, normalization only requires 2 rows from each of the II and SII frames at any one time. Furthermore, standard deviation is only updated when the search window actually moves.

Once the 2D search window array 606 is full and ready to use, the first Haar features of the first stage can begin evaluation on the very first search window (located at 0, 0). A feature evaluation block 614 reads in the corner pixel locations from a Haar feature locations memory 616. The feature evaluation block 614 evaluates the sum of as many Haar features as possible until the stage is ready for evaluation.

The evaluation of each Haar feature is passed to a stage evaluation block 618 that evaluates each stage using feature thresholds and weights from a feature thresholds and weights memory 620 and stage thresholds from a stage threshold memory 622. The stage evaluation block 618 will choose a left node value or a right node value for each Haar feature, and accumulate the values into a stage total. When the last Haar feature of the stage is finished, the stage total is evaluated. If the stage fails, the search window is advanced to the next pixel step and the process begins again. However, if the stage passes, the Haar feature locations memory 616 is advanced to the next stage of Haar features. Once a search window passes all stages, coordinates of the location of an object in the image is forwarded to a coordinate FIFO register 624.

A clock gating buffer 626 controls the input to the line buffers 604, 610. The integral image generation by the II generate module 602 and the squared integral image is generated in the SII generate. The search window array is 32 by 32 so only 18-bits of integral image and 26-bits of squared integral image are produced. An interface 628 is provided for communication with the image node 102 and search nodes 104.

Each of the 32 previous integral pixels are retained in an accumulator (not illustrated), and when a new integral column is read, each pixel is also accumulated in and the 32 accumulated sums passed on as the new integral pixel. The Squared Integral Image SII is computed in a very similar way except that an incoming pixel is squared before being registered. All of the data widths are increased from the integral widths listed by 8-bits (due to the squaring).

The threshold normalization unit 612 scales trained thresholds based on the reciprocal of the standard deviation multiplied by the search window area. Standard deviation is generally straight forward to compute once the pixel total and squared pixel totals for the search window are known.

Figure 7A:
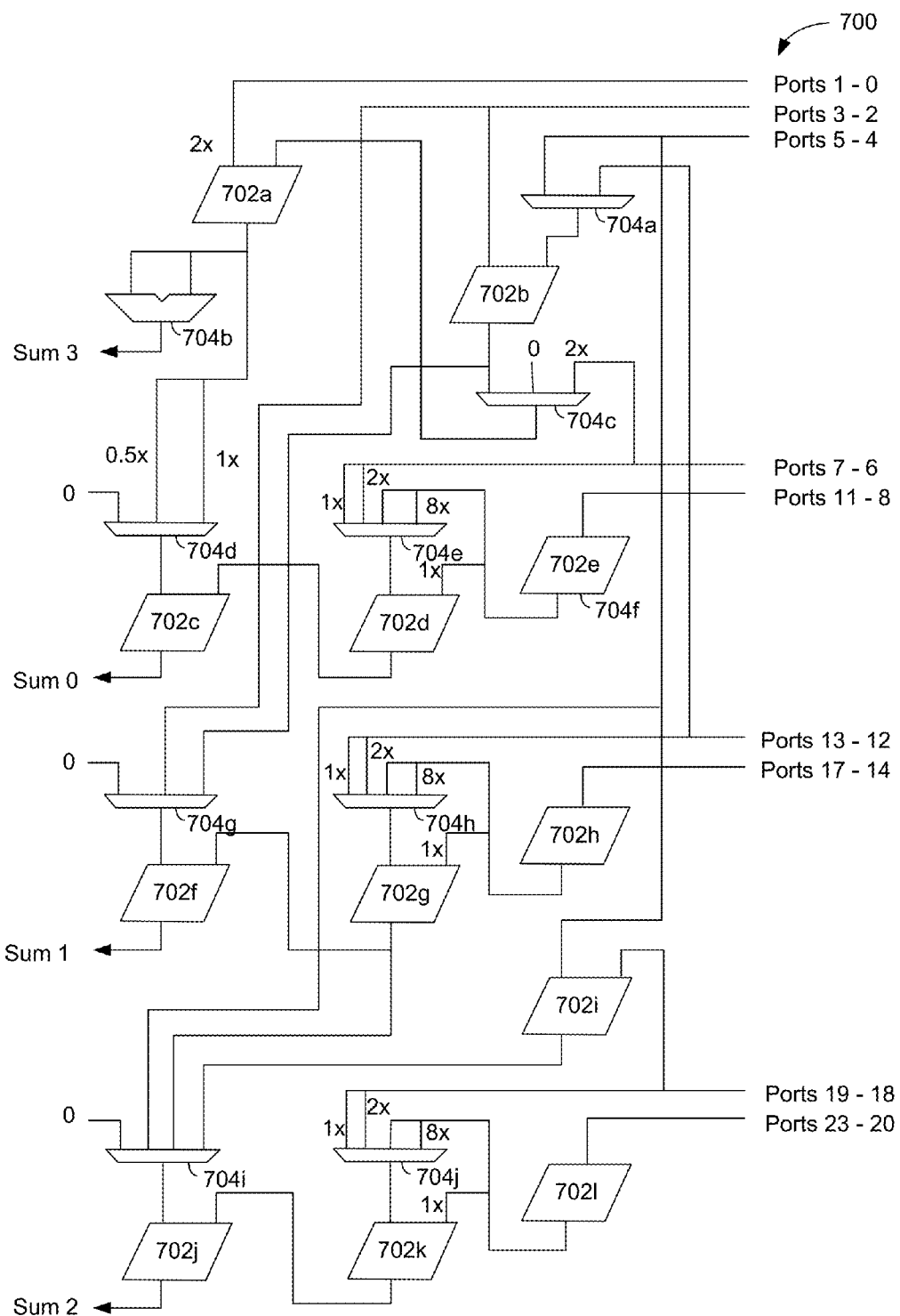

FIG. 7A illustrates an example of a circuit 700 in the form of a cascade classifier for implementing a Haar feature evaluation unit corresponding to feature evaluate block 614 of FIG. 6. In accordance with various embodiments, two Haar feature evaluation units 700 are included within the ESA 302, although only one Haar feature evaluation unit 700 may be included if desired, or more Haar feature evaluation units may be included if desired. This allows for a complete 32×32 search window array of pixels to be performed in parallel. The previously described Haar features are able to be searched by the Haar feature evaluation unit 700. Utilizing the calculated integral images, the values of the calculated integral images are input into the various ports of the feature evaluation unit 700 to arrive at a value at one of the output ports. The values or sums from the out ports, which correspond to the possible presence or non-presence of a Haar feature, are compared to a node threshold. If the value is greater than the node threshold, then a right node value is assigned for that integral image, where the right node value indicates a greater likelihood of the presence of an object in the search window. If the value is less than the node threshold, then a left node value is assigned to the integral image thereby indicating that it is less likely that an object is present in the search window. During a stage, multiple Haar features are evaluated with respect to the integral images within the search window. At the end of a stage, all of the node values are summed and the sum of the node values is compared to a threshold. If the sum of the node values is greater than the threshold, then the stage has been passed. If the sum of the node values is less than the stage threshold, then the stage has failed. Generally, once a search window fails a stage, then no further stages are evaluated with respect to that search window. The search window is moved and the process repeats for the new area of the image for which the search window is overlaid. However, if the stage passes, then another stage of Haar feature evaluations is performed by the Haar evaluation unit 700 with respect to the search window in order to determine if the subsequent stage is passed or not. If all stages are passed, then it is determined that an object has been found. The coordinates of the region of interest (ROI) that includes the object are passed to the ensemble mode 106. The image is searched for an object between a minimum and a maximum object size specified. Thus the image is repeatedly scaled down from an original size such that larger and larger objects can be recognized in a fixed sized search window.

More particularly, FIG. 7A illustrates a circuit 700 for implementing feature types I-V. The circuit 700 comprises a plurality of compression modules 702a, . . . , 702l. Individual ones of the compression modules 702a, 702b, 702d, 702e, 702g, 702h, 702i, 702k and 702l have a compression ratio of 4:2, while individual ones of the compression modules 702c, 702f and 702j have a compression ratio of 4:1. The compression module 702a, for example, concatenates or combines four inputs into two inputs.

The circuit 700 further comprises a plurality of multiplexers 704a, . . . , 704j. Individual ones of the multiplexers may receive a plurality of corresponding inputs, and generate an output based on a feature type (e.g., one of the feature types I-V) being currently implemented by the circuit 700.

Although not illustrated in FIG. 7A, the circuit 700 comprises a plurality of multipliers. For example, an input to the compression module 702a is labeled as 2x, implying that a multiplier (not illustrated in FIG. 7A) multiplies the input to the compression module 702a by two. As another example, an input to the multiplexer 704d is labeled as 0.5×, implying that a multiplier (not illustrated in FIG. 7A) multiplies the input to the multiplexer 704d by 0.5.

As illustrated in FIG. 7A, the circuit 700 may receive input from twenty-four input ports, labeled as ports 0, . . . , 23. The ports may be divided into four groups, with a first group of ports comprising ports 0, . . . , 5; a second group of ports comprising ports 6, . . . , 11; a third group of ports comprising ports 12, . . . , 17; and a fourth group of ports comprising ports 18, . . . , 23. As will be discussed in further detail herein later, individual ones of the ports may receive a corresponding one of the corner coefficients C00, C01, C11, or the like, based on a Haar feature type that is being implemented by the circuit 700. The circuit 700 may be configured to output one or more of sum values 0, 1, 2 and 3, based on a feature type that is implemented by the circuit 700.

FIG. 7B illustrates the circuit 700 implementing an analysis with respect to the Haar feature type I, FIG. 7C illustrates the circuit 700 implementing the Haar feature type II, FIG. 7D illustrates the circuit 700 implementing the Haar feature III, FIG. 7E illustrates the circuit 700 implementing the Haar feature type IV, and FIG. 7F illustrates the circuit 700 implementing the Haar feature type V. Table 3 below provides, for each Haar feature type, a mapping between individual ports and the corner coefficient received at the corresponding ports while the circuit 700 implements the corresponding Haar feature type. Table 3 also illustrates the multipliers by which the corner coefficients are multiplied, while the corner coefficients are being transmitted via the circuit 700.

TABLE 3

| Port | Type I Sum | Type I Mult. | Type I Corner | Type II Sum | Type II Mult. | Type II Corner | Type III Sum | Type III Mult. | Type III Corner | Type IV Sum | Type IV Mult. | Type IV Corner | Type V Sum | Type V Mult. | Type V Corner |
|---|---|---|---|---|---|---|---|---|---|---|---|---|---|---|---|
| 0 | Sum 3 | 2 | C01 | Sum 0 | 1 | C10 | Sum 0 | 2 | C01 | Sum 0 | 1 | C30 | Sum 3 | Feature type I | |
| 1 | | 2 | C11 | | 1 | −C13 | | 2 | −C03 | | 1 | −C33 | | supported only | |
| 2 | | 1 | C12 | Sum 1 | 1 | C10 | Sum 1 | 1 | C01 | Sum 1 | 1 | C30 | | if sum 0 is also | |
| 3 | | 1 | −C02 | | 1 | −C13 | | 1 | −C03 | | 1 | −C33 | | feature tyle I | |
| 4 | | 1 | C10 | Sum 2 | 1 | C10 | Sum 2 | 1 | C01 | Sum 2 | 1 | C30 | | | |
| 5 | | 1 | −C00 | | 1 | −C13 | | 1 | −C03 | | 1 | −C33 | | | |
| 6 | Sum 0 | 2 | C01 | Sum 0 | 1 | C03 | Sum 0 | 2 | C13 | Sum 0 | 1 | C03 | Sum 0 | Feature types | |
| 7 | | 2 | −C11 | | 1 | −C00 | | 2 | −C11 | | 1 | −C00 | | I, II, III, IV, V | |
| 8 | | 1 | C12 | | 3 | C12 | | 1 | C10 | | 9 | C22 | | supported for | |
| 9 | | 1 | −C02 | | 3 | −C11 | | 1 | −C14 | | 9 | −C21 | | sum 0 | |
| 10 | | 1 | C10 | | 3 | C01 | | 1 | C04 | | 9 | C11 | | | |
| 11 | | 1 | −C00 | | 3 | −C02 | | 1 | −C00 | | 9 | −C12 | | | |
| 12 | Sum 1 | 2 | C01 | Sum 1 | 1 | C03 | Sum 1 | 2 | C13 | Sum 1 | 1 | C03 | Sum 2 | 2 | C12 |
| 13 | | 2 | −C11 | | 1 | −C00 | | 2 | −C11 | | 1 | −C00 | | 2 | −C11 |
| 14 | | 1 | C12 | | 3 | C12 | | 1 | C10 | | 9 | C22 | | 1 | C01 |
| 15 | | 1 | −C02 | | 3 | −C11 | | 1 | −C14 | | 9 | −C21 | | 1 | −C02 |
| 16 | | 1 | C10 | | 3 | C01 | | 1 | C04 | | 9 | C11 | | 1 | C01 |
| 17 | | 1 | −C00 | | 3 | −C02 | | 1 | −C00 | | 9 | −C12 | | 1 | −C20 |
| 18 | Sum 2 | 2 | C01 | Sum 2 | 1 | C03 | Sum 2 | 2 | C13 | Sum 2 | 1 | C03 | | 2 | C21 |
| 19 | | 2 | −C11 | | 1 | −C00 | | 2 | −C11 | | 1 | −C00 | | 2 | −C11 |
| 20 | | 1 | C12 | | 3 | C12 | | 1 | C10 | | 9 | C22 | | 1 | C10 |
| 21 | | 1 | −C02 | | 3 | −C11 | | 1 | −C14 | | 9 | −C21 | | 1 | −C22 |
| 22 | | 1 | C10 | | 3 | C01 | | 1 | C01 | | 9 | C11 | | 1 | C10 |
| 23 | | 1 | −C00 | | 3 | −C02 | | 1 | −C00 | | 9 | −C12 | | 1 | −C00 |

FIG. 7B illustrates the circuit 700 implementing the Haar feature type I. In FIG. 7B, those lines that are used to implement the equations associated with the Haar feature type I are illustrated in bold. As an example, the multiplexer 704a may be configured to receive (i) input from ports 4-5 and (ii) input from ports 12-13. While Haar feature type I is being implemented by the circuit 700, the multiplexer 704a may be configured to output the input received from ports 4-5, while refraining from outputting the input received from ports 12-13. Thus, the line between ports 4-5 and the multiplexer 704a is illustrated in bold (implying that the signal transmitted by this line is transmitted to the next component, and is used in implementing the feature type I), while the line between ports 12-13 and the multiplexer 704a is not illustrated in bold.

As previously discussed herein, the equation used for implementing Haar feature type I is given by:

$$\text{sum}(TI) = C_{12} - 2C_{11} - C_{02} + 2C_{01} + C_{10} - C_{00}$$

As illustrated in FIG. 7B and as will be discussed in detail herein later, the circuit 700 outputs sum 3, based on inputs from ports 0-5, such that the value of sum 3 is equal to sum(TI). Similarly, the circuit 700 outputs sum 0, sum 1 and sum2, each of which is equal to the sum(TI).

As illustrated in the Table 3, for Haar feature type I, the ports 0, . . . , 5 receives corner coefficients C01, −C11, C12, −C02, C10 and −C00, respectively. The corner coefficients C01 and −C11 from ports 0 and 1 are multiplied by 2, as illustrated in FIG. 7B (illustrated as "2×" in the line between ports 1-0 and the compression module 702a), and as also illustrated in Table 3. Thus, the multiplexer 704b receives (2C01−2C11) as one of its input.

Furthermore, the corner coefficients C12 and −C02 from ports 2 and 3, respectively, are received in the multiplexer 704b, via the compression module 702b, the multiplexer 704c and the compression module 702a. No multiplication is performed to the inputs from ports 2 and 3, as illustrated in FIG. 7B and Table 3. Accordingly, the multiplexer 704b also receives (C12−C02) as one of its input.

Also, the corner coefficients C10 and −C00 from ports 4 and 5, respectively, are received in the multiplexer 704b, via the multiplexer 704a, the compression module 702b, the multiplexer 704c and the compression module 702a. No multiplication is performed to the inputs from ports 4 and 5, as illustrated in FIG. 7B and Table 3. Accordingly, the multiplexer 704b also receives (C10−C00) as one of its input.

Thus, the multiplexer 704b receives the following three inputs: (i) (2C01−2C11) from ports 0-1, (ii) (C12−C02) from ports 2-3, and (iii) (C10−C00) from ports 4-5. The multiplexer 704b outputs these three inputs (e.g., in sequence), such that they are summed at the output of the multiplexer 704b. Thus, the summation of the three outputs of the multiplexer 704b results in (2C01−C11+C12−C02+C10−C00) (illustrated as sum 3 in FIG. 7B), which is the sum(TI) discussed above for the Haar feature type I.

Similar to the generation of sum 3, the circuit 700 also generates sum 0, sum 1 and sum 2, as illustrated in FIG. 7B and Table 3. Each of the sum 0, sum 1 and sum 2 is equal to (2C01−C11+C12−C02+C10−C00), which is the sum(TI) discussed above for the Haar feature type I.

FIG. 7C illustrates the circuit 700 implementing an analysis with respect to the Haar feature type II. Table 3 also maps, for Haar feature type II, individual ports with the corner coefficients received at the corresponding ports. Similar to FIG. 7B, in FIG. 7C, those lines that are used to implement the equations associated with the Haar feature type II are illustrated in bold.

As previously discussed herein, the equation used for implementing Haar feature type II is given by:

$$\text{sum}(TII) = 2C_{12} - 2C_{11} - 2C_{02} + 2C_{01} + C_{12} - C_{11} - C_{02} + C_{01} - C_{13} + C_{10} + C_{03} - C_{00}$$

In sum(TII), there are twelve terms. It is to be noted that the terms $(2C_{12} - 2C_{11} - 2C_{02} + 2C_{01})$ and the terms $(C_{12} - C_{11} - C_{02} + C_{01})$ in sum(TII) have the same corner coefficients, but with different multipliers. There are four other terms $(-C_{13} + C_{10} + C_{03} - C_{00})$ in sum(TII).

As illustrated in FIG. 7C, the output of the multiplexer 704b is not enabled for Haar feature type II (e.g., not illustrated using bold lines). That is, the circuit 700 does not output sum 3 for Haar feature type II. Furthermore, for feature type II, inputs from ports 0 and 1 are used to generate sum 0, in addition to using inputs from ports 6-11. Also, inputs from ports 2 and 3 are used to generate sum 1, in addition to using inputs from ports 12-17. Inputs from ports 4 and 5 are used to generate sum 2, in addition to using inputs from ports 18-23. Put differently, sum 0 is generated based on inputs from ports 0-1 and 6-11. Similarly, sum 1 is generated based on inputs from ports 2-3 and 12-17. Furthermore, sum 2 is generated based on inputs from ports 4-5 and 18-23.

Referring to Table 3, for generating sum 0, ports 0-1 and 6-11 receive corner coefficients C10, −C13, C03, −C00, C12, −C11, C01 and −C02, respectively. As illustrated in FIG. 7C, the corner coefficients C10 and −C13 are received in the compression module 702c from the ports 0-1, via the compression module 702a and the multiplexer 704d. Also, each of the corner coefficients C10 and −C13 are multiplied by 2 and 0.5, while being transmitted from the ports 0-1 to the compression module 702c (e.g., multiplied by 2 between ports 0-1 and the compression module 702a, illustrated by "2×"; and also multiplied by 0.5 between the compression module 702a and the multiplexer 704d, illustrated by "0.5×"). Thus, effectively, the corner coefficients C10 and −C13 are multiplied by (2×0.5), i.e., by 1 (e.g., as illustrated in Table 3), and the compression module 702c receives and outputs (C10-C13) from ports 0-1.

The compression module 702c also receives the corner coefficients C03 and −C00 from ports 6-7, respectively, via the multiplexer 704c, the compression module 702a and the multiplexer 704d. As illustrated in FIG. 7C, the corner coefficients C03 and −C00 are multiplied by 2 and 0.5, i.e., effectively by 1, prior to being received by the compression module 702c (e.g., as illustrated in Table 3). Thus, the compression module 702c receives and outputs (C03−C00) from ports 6-7.

The compression module 702c also receives the corner coefficients C12, −C11, C01 and −C02 from ports 8-11, respectively, via two routes. For example, the compression module 702c receives the corner coefficients C12, −C11, C01 and −C02 from ports 8-11, respectively, via a first route comprising the compression module 702e, the multiplexer 704e, and the compression module 702d. In the first route, between the compression module 702e and the multiplexer 704e, each of the corner coefficients C12, −C11, C01 and −C02 is multiplied by 2. The compression module 702c also receives the corner coefficients C12, −C11, C01 and −C02 from ports 8-11, respectively, via a second route comprising the compression module 702e and the compression module 702d (i.e., the second route bypasses the multiplexer 704e). The corner coefficients are multiplied only by 1 while being transmitted via the second route. Thus, subsequent to the compression module 702c receiving the corner coefficients C12, −C11, C01 and −C02 from ports 8-11, respectively, via the first and second routes, each of these corner coefficients are multiplied by 2 (e.g., while being transmitted via the first route) and also by 1 (e.g., while being transmitted via the second route). Thus, the compression module 702c receives and outputs ((2C12−2C11+2C01−2C02)+(C12−C11+C01−C02)) from ports 8-11. That is, each of the corner coefficients C12, −C11, C01, and −C02 are multiplied by 3, as illustrated in Table 3.

Thus, the compression module 702c receives and outputs (i) (C10−C13) from ports 0-1, (ii) (C03−C00) from ports 6-7, and (iii) (2C12−2C11+2C01−2C02+C12−C11+C01−C02) from ports 8-11. These outputs of the compression module 702c are summed, resulting in sum 0, which is given by (2C12−2C11+2C01−2C02+C12−C11+C01−C02+C10−C13+C03−C00), and which is equal to sum(TII). That is, while the circuit 700 implements the Haar feature type II, the sum 0 of the circuit 700 is equal to sum(TII).

In a similar manner, the circuit 700 outputs sum 1 and sum 2, each of which is equal to sum(TII), as illustrated in FIG. 7C and Table 3.

FIG. 7D illustrates the circuit 700 implementing an analysis with respect to the Haar feature type III, FIG. 7E illustrates the circuit 700 implementing the feature type IV, and Table 3 provides, for each of Haar feature types III and IV, a mapping between individual ports and the corner coefficient received at the corresponding ports. Based on the discussion associated with Haar feature types I and II, the operation of the circuit 700 for each of feature types III and IV is readily apparent from FIGS. 7D, 7E and Table 3. Accordingly, a more detailed discussion of the implementation of the circuit 700 for Haar feature types III and IV is omitted herein.

FIG. 7F illustrates the circuit 700 implementing an analysis with respect to Haar feature type V, and Table 3 provides, for Haar feature type V, a mapping between individual ports and the corner coefficients received at the corresponding ports.

As illustrated in FIG. 7F and Table 3, based on the ports 12-23 receiving the corner coefficients C12, −C11, C01, −C02, C01, −C20, C21, −C11, C10, −C22, C10 and −C00, respectively, the sum 2 at the output of the compression module 702j represents represent the sum(TV), which is given by sum(TV)=2C12−4C11−C02−+2C01+2C21−C20+2C10−C22−C00.

Although the mapping is not illustrated in Table 3, based on the ports 0-11 receiving the corner coefficients C12, −C11, C01, −C02, C01, −C20, C21, −C11, C10, −C22, C10 and −C00, respectively, the sum 0 at the output of the compression module 702c may also represent the sum(TV). That is, in an example, the circuit 700 may output sum 0 and sum 2, each of which may be equal to sum(TV).

In an embodiment, while the sum 2 represents sum(TV), at least some of the ports 0-11 may simultaneously be used to output any one of sum(TI), sum(TII), sum(TIII), sum (TIV) and sum(TV) at the output of the compression module 702c. That is, while the inputs of the ports 12-23 are used to generate a feature type V output at sum 2, inputs of at least some of the ports 0-11 may be used to implement one of feature types I, II, III, IV or V at sum 0, as illustrated in the Table 3.

Also, if Haar feature type I is implemented at sum 0 using inputs from ports 6, . . . , 11, then Haar feature type I may also be implemented at sum 3 using inputs from ports 0, . . . , 5 (e.g., while feature type 5 is being implemented at sum 2, using inputs from ports 12-23).

In accordance with various embodiments, the Haar features vary as to importance in passing a stage. Thus, the right node and left node values assigned for each Haar feature are proportional to the importance of the Haar feature with respect to passing a stage evaluation. For example, the more important the Haar feature may be, the greater the difference between the right node value and left node value. For example, an important Haar feature may have a right node value of +5 and a left node value of −5, while a lesser important Haar feature may have a right node value of +1 and a left node value of −1. A training algorithm is utilized to set node values.

In accordance with various embodiments, the ESA 300 works on a small group of search windows in parallel and can skip from one to the other within a current buffer or group of search windows. The ESA 300 needs to evaluate all search windows, so even if a search window is started that will eventually pass many stages, there is never a shortage of necessary operations that can be started. Any new search window can always be started without any speculation whether the computations are necessary or not. The first stage will always need to be evaluated for every search window. The only exception is when the input image gets down to the very end, and it runs out of new search windows (i.e. pixel columns) to introduce.

As long as new search windows can be introduced, then there is never a need to speculate on any search window stages' need for execution. After the first search window is started, new search windows can be started every cycle after that until the first search window's first stage completes. Once the first search window's first stage completes, then it will be known if the first search window passes on to stage two or if the first search window failed and the search window is retired. In general, the first column of pixel values written is the first to be replaced.

It is desirable that results of stages issue completely once the results of stages start issuing. In this way there is no need to track and match up intermediate results. Instead, new Haar feature results simply accumulate with previous ones at the end of the cascade classifier. This also avoids speculatively issuing instructions by completing stage N and testing stage N's result and only starting stage N+1 if stage N has actually passed. This is referred to as end-to-end execution because a stage must come out the back end of the stage evaluation logic of the ESA 300 before being allowed to reenter the front end of the stage evaluation logic. If speculative execution can't be avoided, then it is preferable to speculate on the maximum number of search windows possible. It is probable that any particular search window may proceed to pass all stages all the way through the very last stage. However, if a particular search window passes stage N, then it is probable that other nearby search windows will also pass stage N. Thus, when speculative issue is unavoidable, then speculating on as many local search windows as possible will increase the hit rate of the speculations.

It is desirable to remain in end-to-end issue mode while keeping the stage evaluation logic completely full for as long as possible. When a current search window requires more stages to complete than other search windows nearby that are entering the stage evaluation logic, it may not be possible to issue the additional stages for the current search window with certainty. That is, it may be necessary to issue speculatively because there isn't room to introduce any new windows into the cascade classifier and none of the currently executed stages have finished for the current search window, so it can't yet be determined if the next stage will be needed or not for the current search window. When this happens, the stage evaluation logic will move into a speculative issue mode.

End-to-end issue mode simply waits for the result of stage N+1 before starting stage N+1, so that stage N+1 is only started if it has been determined to be necessary (rather than simply speculating). As previously noted, the control strategy strives to stay in End-To-End mode whenever possible. Only when nothing in the stage evaluation logic can issue with certainty and there is no room to add any windows into the search window array, then the issues mode must become speculative.

Just because no stages can be started with certainty does not mean that stage results stop. Rather it means that stage results will now be speculative until certainty can be reestablished. The focus of this particular mode is the oldest search window remaining in the cascade classifier. If the oldest search window can be retired, then there will be space in the search window buffer and a new search window can begin. If a new search window can begin, then the control will no longer need to be speculative.

Given that search windows in a common area of the image tend to penetrate into the cascade classifier to similar stages, it is more reasonable to speculate that each active search window will pass to the next stage rather than that only one of the search windows will penetrate deep into the cascade classifier stages while the other search windows around the one search window quickly retire. The speculative mode takes this into account by tracking all active search windows in the cascade classifier and taking turns speculating on whether or not the search windows will pass a stage. The speculation must start with the oldest search window since the oldest search window is where any new columns must be written into the cascade classifier.

Any search windows that are initially speculated to pass a future stage but are later retired should be removed from the cascade classifier such that such search windows are not processed within the cascade classifier anymore (speculatively or not). The speculation continues until the oldest search window is retired by either failing a stage or passing all the stages.

Figure 8:
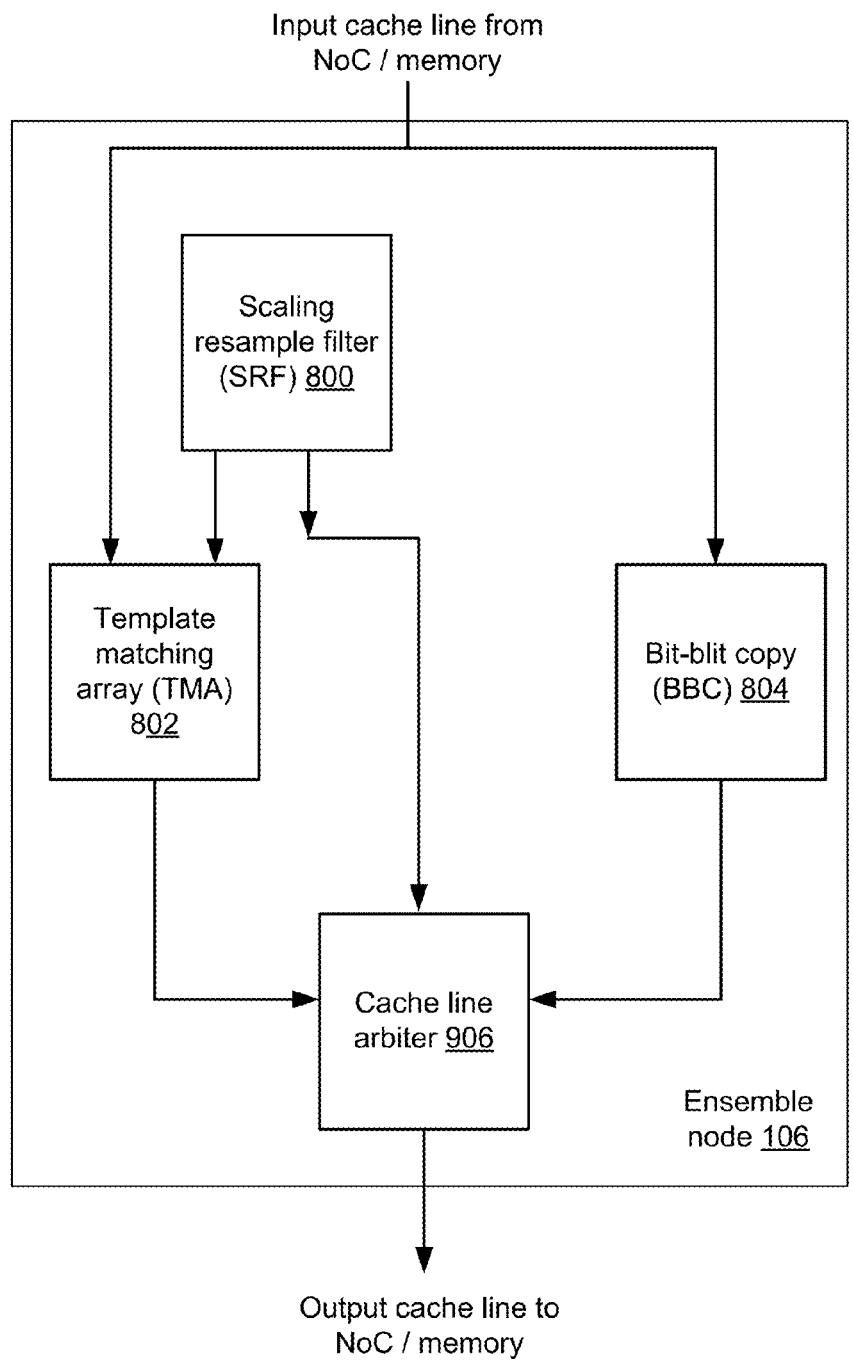
FIG. 8 schematically illustrates an ensemble node of the ASIC of FIG. 1, in accordance with various embodiments.

FIG. 8 schematically illustrates the ensemble node 106. The ensemble node 106 augments the search node 104. The initial search from the search node 104 can be equated to finding a Region of Interest (ROI). The ensemble node 106 accelerates post-search tasks such as stereo association and primary face selection or temporal association.

Even when the search node 104 initially appears to produce a strong detection by finding a face in both the left and right stereo images, such a finding still needs to be confirmed. It is confirmed by comparing that the position and size of a face found in one image has a corresponding face of the appropriate size and position in the other stereo image of the pair of images. If there are multiple faces in the frame the ensemble node creates a depth map of any faces found in the images and selects the face closest to the cameras as the face to track. Furthermore, histories of previously found face templates are retained in order to distinguish a primary user from other faces found in the image. Once the primary face has been found, the ensemble node 106 sends the face back to the search node 104 to extract the features from the face. The ensemble node then sends the features and X, Y, Z coordinates of the location of the face to the application processor (not illustrated).

The ensemble node 106 is primarily designed to compare a face found in one image to an area of interest in another spatially or temporally related image. The ensemble node 106 includes a mechanism for comparing a small area of one image to a somewhat larger area of another image. The small image is generally referred to as a template, and the act of comparison is referred to as template matching. The ensemble node 106 uses integral image pixel values computed by the search node 104.

The ensemble node 106 includes a SRF 800 that is identical to the SRF 302 of the search node 104. The ensemble node 106 further includes a template matching array (TMA) 802, a Bit-Blit Copy (BBC) 804 and a cache line arbiter 806.

The SRF 800 can be used independently or it can be configured to feed scaled images directly into the TMA 802. Once matches are found by the TMA 802, the ensemble node 106 needs to organize the information by moving templates or pieces of images around. These pieces of images are referred to as "bit-blits." The bit-blits are moved around by the BBC 804. The BBC 804 is dedicated hardware support for copying sub-frame windows of pixels from one location to another. A common example is the retention of the most recent 10 matching face templates used by the TMA 802.

Figure 9:
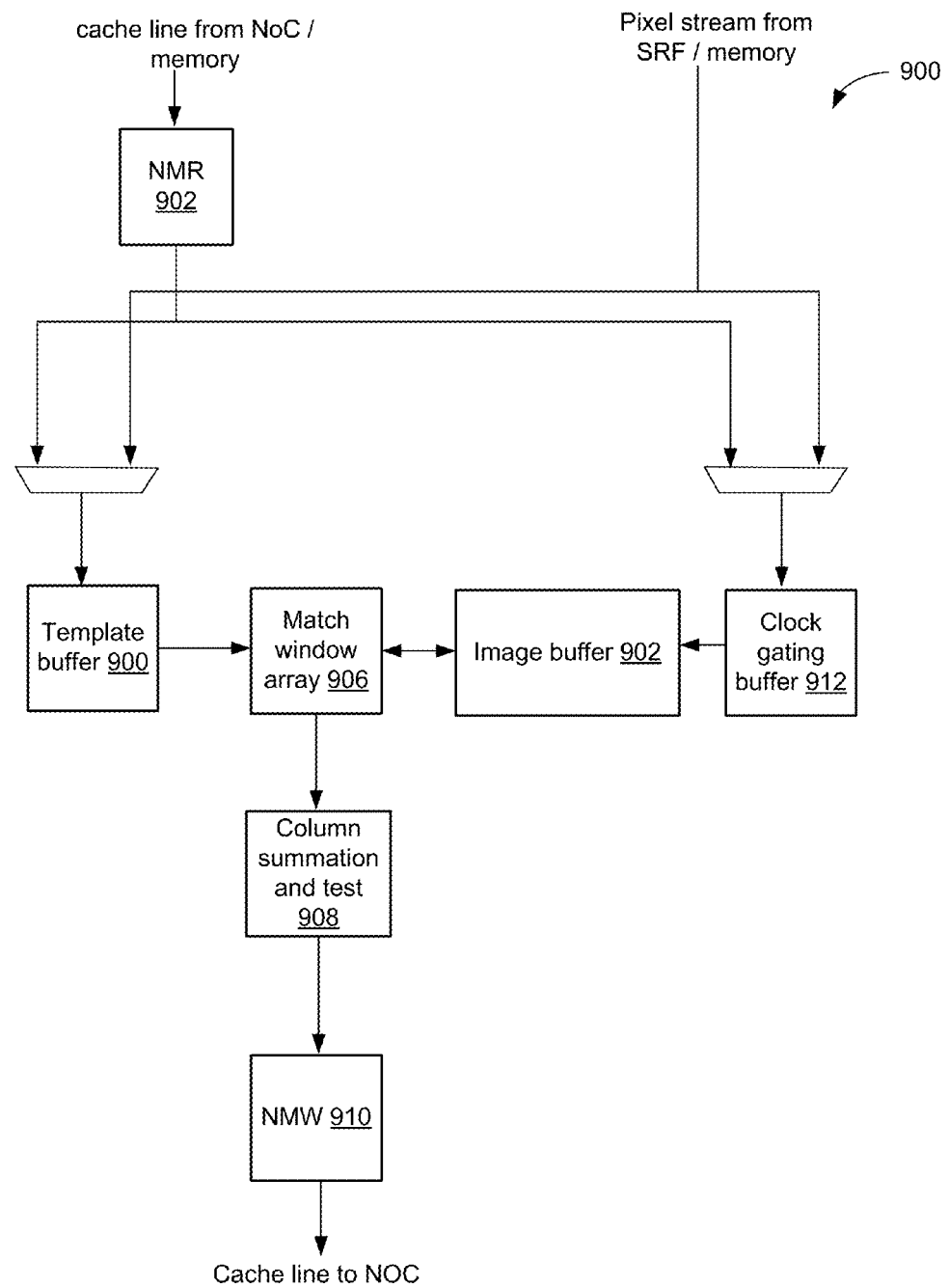
FIG. 9 schematically illustrates a template matching array of the ensemble node of FIG. 8, in accordance with various embodiments.

FIG. 9 schematically illustrates the TMA 802. As can be seen, the TMA 802 largely comprised of a 2D register array/line buffer structure similar to the ISPs 200, 202 and the ESA 300. In the TMA 802, a parallel buffer 900 is used to store a current template. The template buffer receives a template from a NoC memory read (NMR) block 902. The template is a 32×32 template of integral image pixel values for the ROIs in the images from the search node 104 and can either be a previous template stored in memory or can be based upon one of the two images where an object was found in the ROIs by the search node 104.

The template buffer 900 and an image buffer 904 both feed the 2D match window array 906 where partial comparison data is generated. The comparison data is partial because it is only summed over each row in the 2D window. A column of row results are output from the 2D window once every pixel cycle after the template has been completely circulated the first time.

Each partial result column is passed to a column summation and test block 908 where the column is processed into a pixel locations complete template matching result. The comparison result pixel is passed to a NoC memory write (NMW) block 910 for assembly into cache lines and output to the NoC, i.e. memory 112b or 112c. Each of the matching result pixels is tested to find a minimum or maximum value across the image. There are multiple types of matching methods that can be specified. Some of the methods indicate a best match as the minimum pixel result and other methods indicate a best match by a maximum result pixel value.

The TMA 802 will only start generating comparison pixel output once a full template is loaded into the template buffer 900. However, the TMA 802 can proceed to load the image buffer 902 until the full template is loaded. The image pixels can be loaded from the SRF 800 or from memory 112b. A clock gating buffer 912 controls the loading of the image pixels into the image buffer 902.

Table 4 below provides examples of comparison methods that can be used by the match window array 906.

TABLE 4

| Method | Best Match | Description |
| --- | --- | --- |
| SQDIFF | Min | Simple square of the differences |
| SQDIFF_NORM | Min | Simple square of the differences w/ normalization |
| CCORR | Max | Cross correlation |
| CCORR_NORM | Max | Cross correlation w/ normalization |

The comparison methods can be normalized by dividing the comparison result by the square root of the product of the sum of template pixels squared and the sum of the image pixels that are covered by the template squared. More particularly, the normalization of any of the pixel results can be computed by multiplying it by the normalization value:

$$N = \frac{1}{\sqrt{\sum_{x',y'} T(x', y')^2 \cdot \sum_{x',y'} I(x+x', y+y')^2}}$$

where x' represents the range of the x positions of the 32×32 template and y' represents the range of the y positions of the 32×32 template.

Each of the 2D match array taps in the match window array 906 is a standalone computational engine capable of calculating a partial comparison result. The physical micro-architecture is sensitive to the large number of such computational elements.

In accordance with various embodiments, the match window array 906 performs the comparison using a multi-pass strategy, which utilizes less power. A full 32×32 match is still supported, but the match window array 906 actually implements the comparison as two passes through a 32×16 array. Each computational engine is now shared by 4-pixel comparison, so the physical array is actually an array 8-engines wide and 16-engines tall where each engine handles a 1-row of 4-pixels.

Figure 10A:
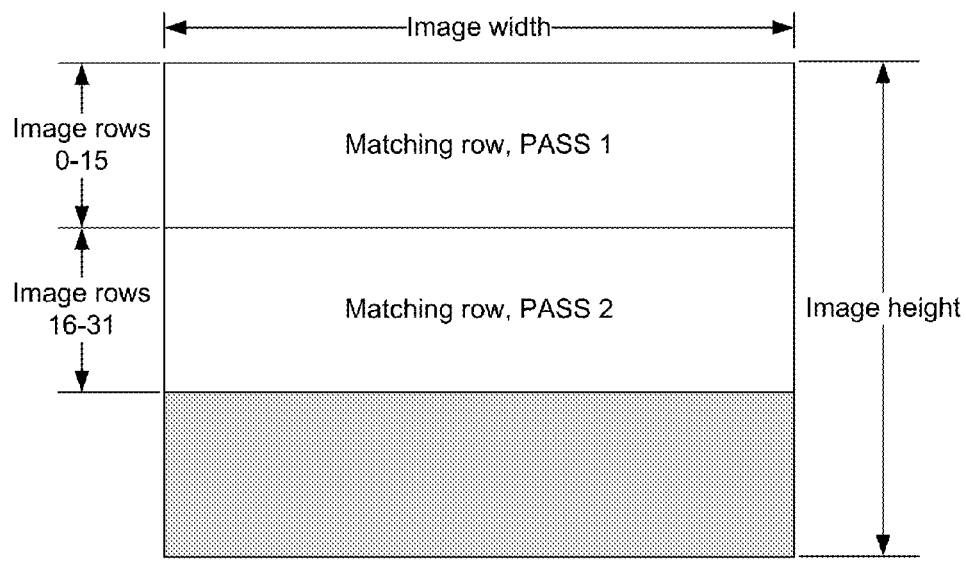
FIGS. 10A and 10B schematically illustrate line buffers of the template matching array of FIG. 9, in accordance with various embodiments.

Referring to FIG. 10A, it can be seen that the line buffers still contain a full template height of 32 image rows, but they are read out only 16 rows at a time. The partial results of the image comparison and the image summation are both saved from pass 1 and compressed into pass 2. Once matching row 0 has been fully compared, the top image row can be discarded from the line buffers and matching row 1 can then begin processing, as illustrated in FIG. 10B.

Figure 10B:
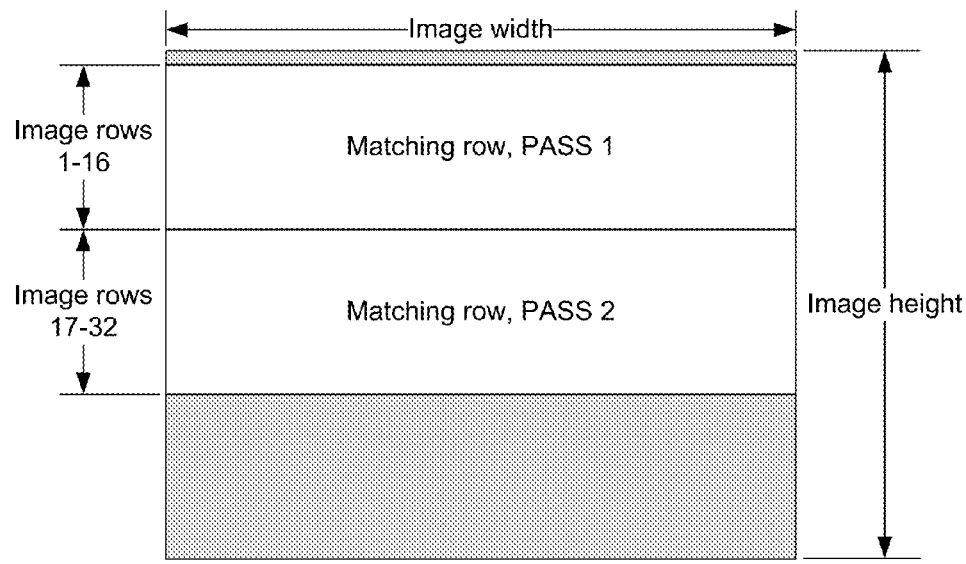
Figure 11:
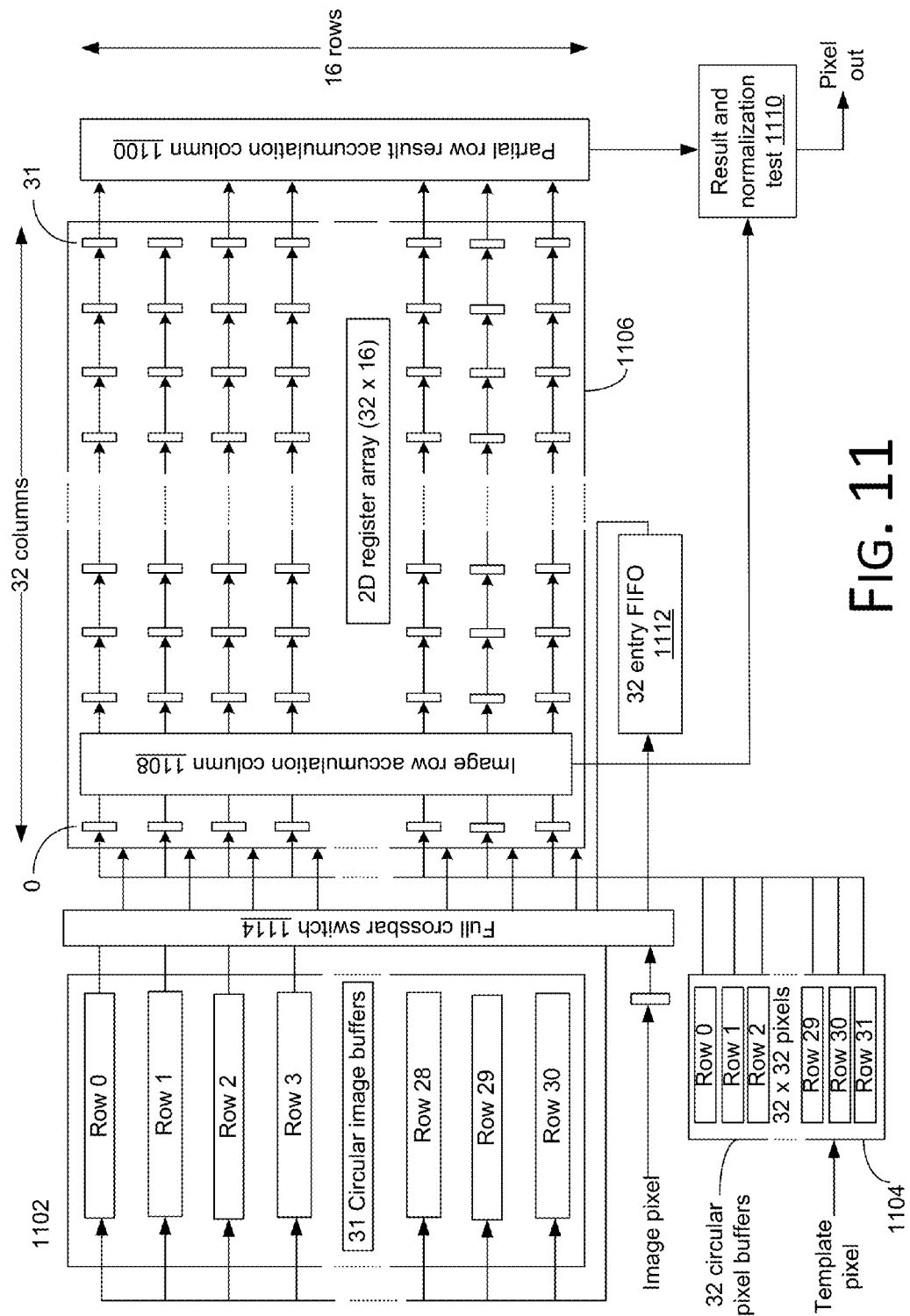
FIG. 11 schematically illustrates a match window array of the template matching array of FIG. 9, in accordance with various embodiments.

Referring to FIG. 11, which schematically illustrates the match window array 906, the partial comparison results for each pixel result from pass 1 in FIGS. 10A and 10B must be saved into a dedicated line buffer 1100. If normalization is active, then the partial image summation results for each pixel must also be saved into an additional dedicated line buffer (not illustrated). These saved partial results are then read by the second pass and compressed into its partial results before being written back into the dedicated line buffer(s). The results of the $2^{nd}$ pass are final results and can proceed to the normalization and final result computation.

The match window array 906 is an array of small computational engines and logic necessary to feed the computational engines operands to work on. The operands are a 2D image and a smaller 2D template, and each are stored in arrays of circular row buffers 1102, 1104. The circular row buffers 1102, 1104 work very similarly to the ISPs 200, 202 and ESA 300. Specifically, the image buffers 1102 provide access to the complete subset of 32×32 sub-images present in the original image starting at the top left hand corner of the original image and proceeding in raster order through to the bottom right hand corner of the original image. Every pixel cycle the left column of the array is dropped and a new right column is added, so the 32×32 sub-image (or more accurately the 32×16 sub-image) is only valid in the array for a single pixel cycle.

The template is assumed to be loaded into the circular row buffers 1104 before the image is loaded into the circular row buffers 1102, so the template's top 16 rows of pixels can be preloaded into a computational array 1106. The 16 rows of pixels are shifted in from array column 0 (on the left) toward array column 31 (on the right). Once in place, the template pixels are static for the entire 32×16 comparison. The image enters the computational array 1106 much differently. The image is presented to the computational array 1106 one column at a time, and it is provided to every column in the computational array 1106 simultaneously.

On the first cycle that the computational array 1106 is completely filled with template pixels, the first column of the image (i.e. column 0) is compared across all of the columns of the computational array 1106. The first column of the image is only compared to the first column of the template and when the image column gets equal to or larger than the template width, the image pixel will be used in all 32-partial comparison results in parallel.

Each image column is sequenced through and presented to the computational array 1106. Note that the number of comparisons an individual image pixel is used in tapers down as the right edge of the image is approached. In fact the right most image pixel is just like the left in that it is also only used in a single template comparison. This is the reason the template is shifted into the computational array 1106 from left to right rather than the more familiar raster order. The next 16 template pixel rows can enter the array directly behind the last value accumulator for the current 16 rows as the last value accumulator shifts out. However, there is some flexibility because as long as template column 0 is valid, the next 16 rows can start the first accumulation directly behind the current 16 rows.

The rows of the computational array 1106 do not interact except in two specially designed places—the partial row result accumulation column 1100 and an image row accumulation column 1108. The partial row result accumulation column 1100 and the image row accumulation column 1108 are both specially designed columns that are used to aggregate the accumulated row results and combine them into a single result.

The rows of the computational array 1106 operate independent of each other for the most part until a sub-image row result is complete. When ready, the column where the sub-image row exists is selected to enter the partial row image accumulation column 1100. The partial row image accumulation column 1100's primary function is to sum all of the row accumulate results into a final accumulated result and deliver it to a result normalization and formatting block 1110.

The top three partial row results are accumulated into redundant binary, i.e. carry/save, by a full adder vector. This initial 3:2 is followed by another 3:2 for each additional row that is accumulated for a total of 14-each 3:2 stages. The final 3:2 (in row 15) is followed by a full carry propagation adder (CPA), which is used to compute the final column result.

The image accumulation column 1108 is generally more complicated than the partial row result accumulation column 1100 because it also accumulates each row result first. A computational engine is necessary to compute the image accumulation for each row. This computational engine will serve to calculate the sum-of-squares (SoS) for the template, the first 48×48 sub-image in the image row, and then each subsequent 32×32 sub-image in the row. In order to share hardware between the template SoS and the many sub-image SoSs, the template is loaded first into the template buffers 1104 and the template's SoS can be calculated while the image is still being read into the image buffers 1102. The TMA 802 will need to sequence all of the template columns through the match window array 906 once before matching starts in order to compute the template SoS. Note that an accumulator (not illustrated) can be used to retain the accumulated results from the rows 0-15. Template rows 16-31 will simply accumulate with row 0-15 before the individual row accumulators are summed down the column.

The first sub-image in any given image row is calculated much differently than each subsequent sub-image. The first in the row is calculated directly. Specifically, each image pixel is read in, squared, and accumulated with all of the previous pixels in the row. Normally, it would be necessary to retain 31 other partial results in parallel with this first accumulation, but since it is a running total, once the first 32 pixel row result is ready, the next result can be calculated by accumulating in the next squared pixel value (as normal), but also by subtracting the squared pixel value that is being removed from the left edge of the match window array 906 being fed from the right edge of the match window array 906 by the image buffer 902.

A 32-entry FIFO 1112 is provided for the image pixel input row 31 since image pixel input row 31 doesn't require a line buffer. A second read from the line buffers is an option for the other 31 rows because the other 31 rows are only read every 4-cycles. A full crossbar switch 1114 is provided for controlling loading from the circular image buffers 1102 into the computational array 1106.

The result provided by the match window array 906 requires normalization if a normalized comparison method is selected for use. The normalization requires the SoS for both the template and each individual 32×32 sub-image. The template SoS is computed (as the image is still being read in from memory) and saved for the remainder of the frame in a holding register. Once the first image accumulation column result arrives, it is multiplied by the saved SoS resulting in a 52-bit fixed-point result (assuming 32×32). The result has been computed to full accuracy (no rounding or truncation) and then converted to "statistically unbiased round to nearest" in accordance with IEEE 754.

Once the result has been computed and the presence of an object, i.e. a user's face, has been confirmed, the image can be sent to the search node 104 to extract facial features from the image. The final result is a position of the object, i.e. the user's face, given by X, Y and Z coordinates. The position of the user's face is relative to the center between the user's eyes. The coordinates are provided to an application processor, central processing unit, etc. of a portable electronic device that includes the ASIC 100.

Figure 12:
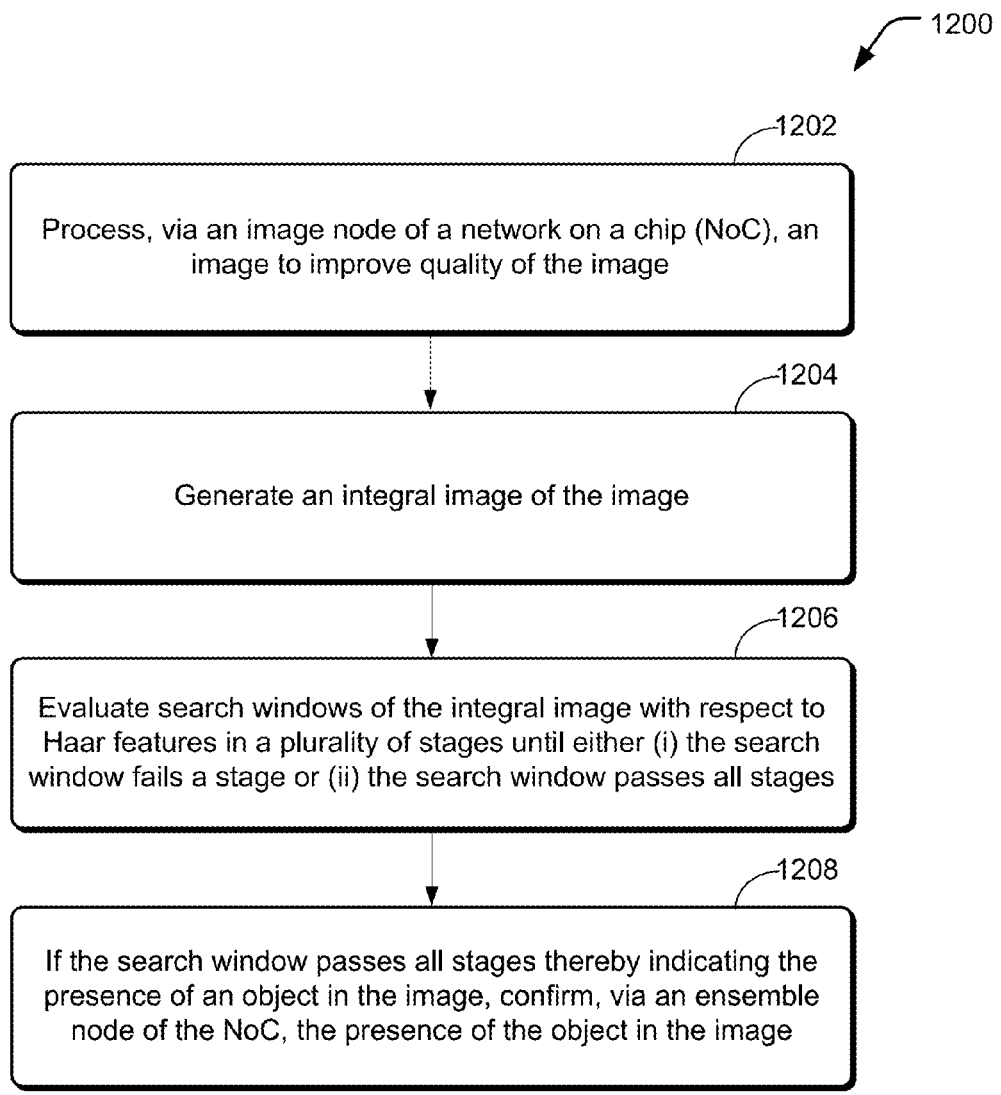
FIG. 12 is a flowchart illustrating an example of a process of locating an object in an image using the ASIC of FIG. 1, in accordance with various embodiments.

FIG. 12 is a flowchart illustrating an example of a process 1200 of a method of locating an object in an input image using an ASIC, for example the ASIC 100, in accordance with various embodiments. At 1202, an image node of an Application Specific Integrated Circuit (ASIC) processes an image to improve quality of the image. A search node of the ASIC searches the image for an object in the image. At 1204, an integral image of the image is generated by the search node. As previously noted, in order to create an integral image, each pixel in the input image is assigned a value that is equivalent to the sum of all the pixels to the upper left of the location of the pixel. More particularly, the integral image is a version of the input image where each pixel is replaced by the value of all of the pixels to the left and above the given pixel location in the input image At 1206, the search node searches search windows of the integral image are evaluated with respect to Haar features, wherein the evaluating the search windows comprises searching each search window in a plurality of stages until either (i) the search window fails a stage or (ii) the search window passes all stages. More particularly, utilizing calculated integral images, the values of the calculated integral images are input into the various ports of a feature evaluation unit to arrive at a value at one of the output ports of the feature evaluation unit. The values or sums at the output ports, which correspond to the possible presence or non-presence of a Haar feature, are compared to a node threshold. If the value is greater than the node threshold, then a right node value is assigned for that integral image, where the right node value indicates a greater likelihood of the presence of an object in the search window. If the value is less than the node threshold, then a left node value is assigned to the integral image thereby indicating that it is less likely that an object is present in the search window. During a stage, multiple Haar features are evaluated with respect to the integral images within the search window. At the end of a stage, all of the node values are summed and the sum of the node values is compared to a threshold. If the sum of the node values is greater than the threshold, then the stage has been passed. If the sum of the node values is less than the stage threshold, then the stage has failed. Generally, once a search window fails a stage, then no further stages are evaluated with respect to that search window. The search window is moved and the process repeats for the new area of the image for which the search window is overlaid. However, if the stage passes, then another stage of Haar feature evaluations is performed by the Haar evaluation unit with respect to the search window in order to determine if the subsequent stage is passed or not. If all stages are passed, then it is determined that an object has been found. The coordinates of the region of interest (ROI) that includes the object are passed to an ensemble node. At 1208, if the search window passes all stages thereby indicating the presence of an object in the image, the ensemble node of the ASIC confirms the presence of the object in the input image.

Figure 13:
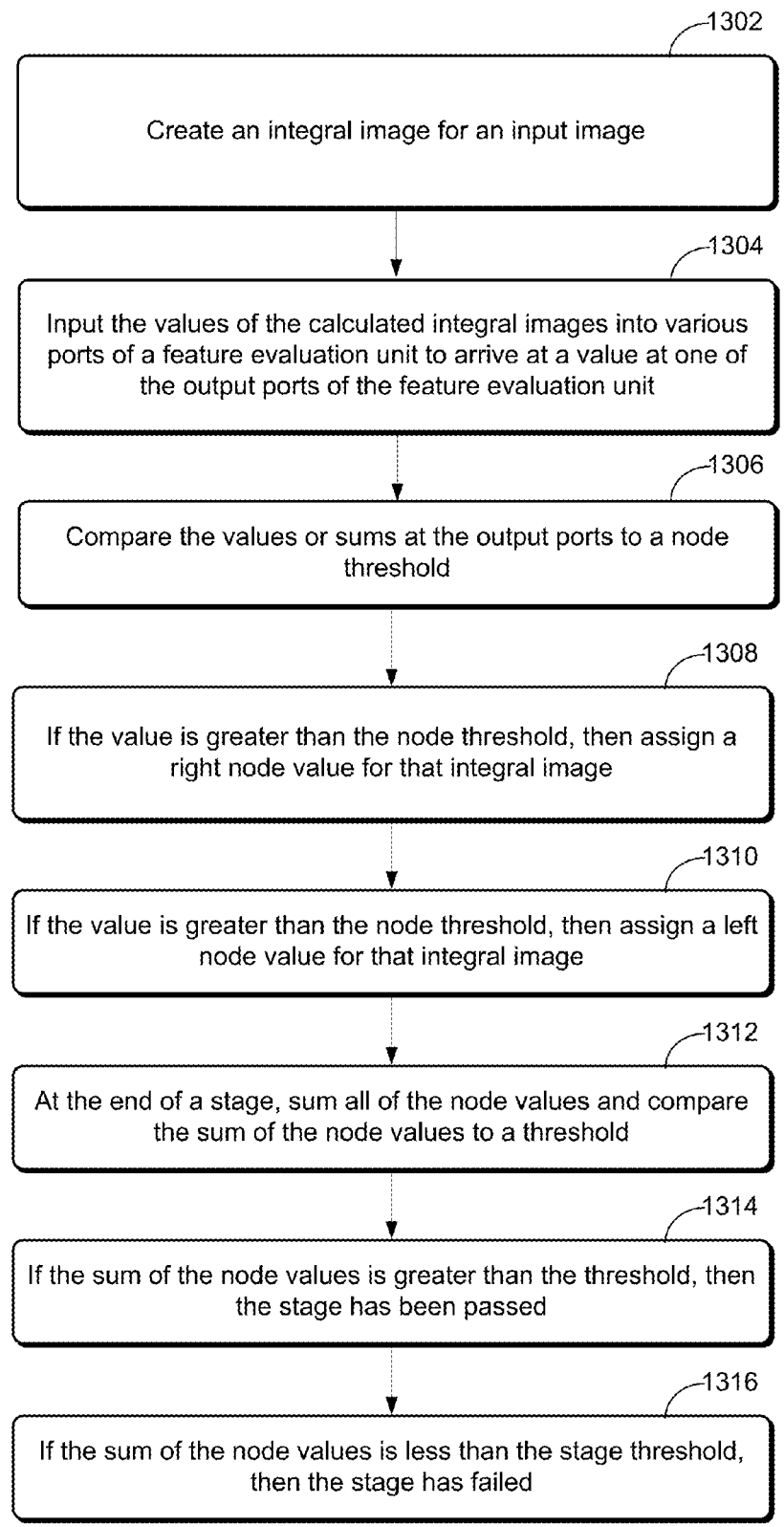
FIG. 13 is a flowchart illustrating operations 1204 and 1206 of FIG. 12 in more detail, in accordance with various embodiments.

FIG. 13 is a flowchart illustrating operations 1204 and 1206 of FIG. 12 in more detail. At 1302, an integral image is created for an input image, where each pixel in the input image is assigned a value that is equivalent to the sum of all the pixels to the upper left of the location of the pixel. At 1304, the values of the calculated integral images are input into various ports of a feature evaluation unit to arrive at a value at one of the output ports of the feature evaluation unit. At 1306, the values or sums at the output ports are compared to a node threshold. At 1308, if the value is greater than the node threshold, then a right node value is assigned for that integral image, where the right node value indicates a greater likelihood of the presence of an object in the search window. At 1310, if the value is less than the node threshold, then a left node value is assigned to the integral image thereby indicating that it is less likely that an object is present in the search window. At 1312, at the end of a stage, all of the node values are summed and the sum of the node values is compared to a threshold. At 1314, if the sum of the node values is greater than the threshold, then the stage has been passed. At 1316, if the sum of the node values is less than the stage threshold, then the stage has failed.

Figure 14:
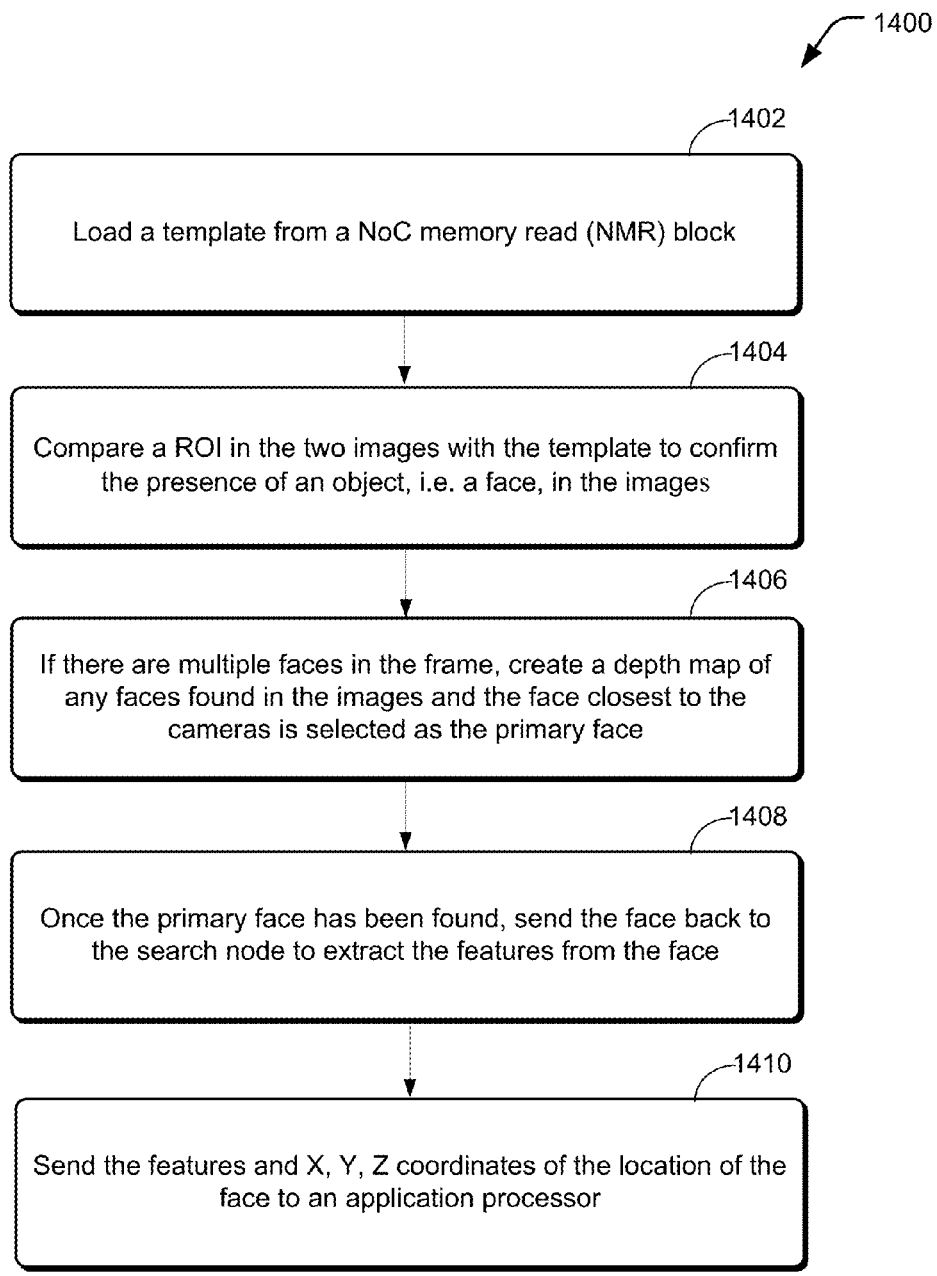
FIG. 14 is a flowchart illustrating an example of a process of confirming the presence of an object in an input image using the ASIC of FIG. 1, in accordance with various embodiments.

FIG. 14 is a flowchart illustrating an example of a process 1400 of a method of confirming the presence of an object in an input image using an ensemble node of an ASIC, for example the ASIC 100, in accordance with various embodiments. At 1402, a template is loaded from a NoC memory read (NMR) block. The template generally is a 32×32 template of integral image pixel values for the ROIs in the stereo images from the search node and can either be a previous template stored in memory or can be based upon one of the two images where an object was found in the ROIs by the search node. At 1404, a ROI in the two images is compared with the template to confirm the presence of an object, i.e. a face, in the images. At 1406, if there are multiple faces in the frame, a depth map of any faces found in the images is created and the face closest to the cameras is selected as the primary face. In general, histories of previously found face templates are retained in order to distinguish a primary user from other faces found in the image. At 1408, once the primary face has been found, the face is sent back to the search node to extract the features from the face. At 1410, the features and X, Y, Z coordinates of the location of the face are sent to an application processor.

Figure 15:
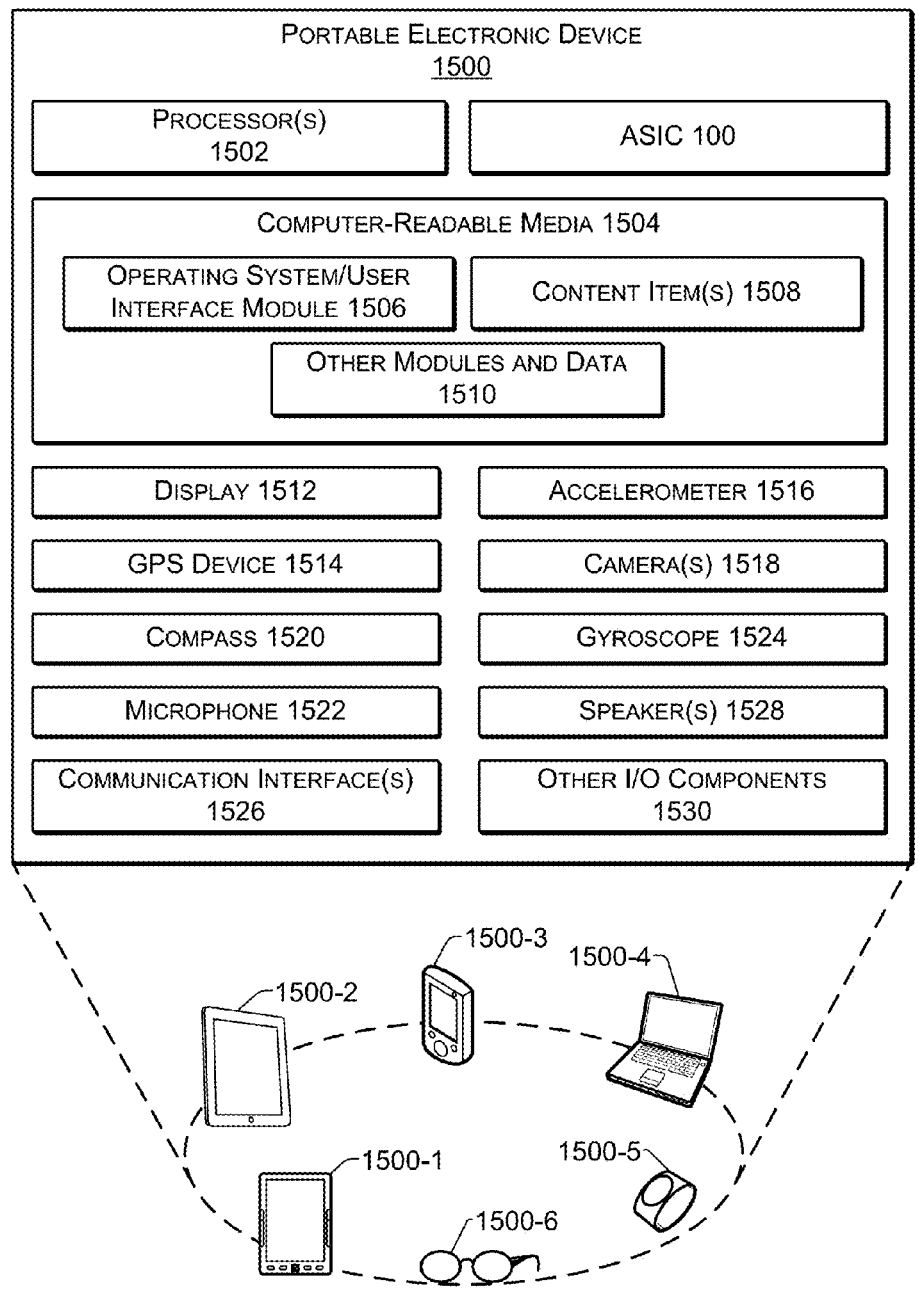
FIG. 15 illustrates select components of an example portable electronic device that includes the ASIC of FIG. 1, in accordance with various embodiments.

FIG. 15 illustrates select example components of an example portable electronic device 1500 that includes an ASIC 100 as described herein. The portable electronic device 1500 may be implemented as any of a number of different types of electronic devices. Some examples of the portable electronic device 1500 may include digital media devices and eBook readers 1500-1; tablet computing devices 1500-2; smartphones, mobile devices and portable gaming systems 1500-3; laptop and netbook computing devices 1500-4; wearable computing devices 1500-5; augmented reality devices, helmets, goggles or glasses 1500-6; etc. This list is only an example and is not meant to be limiting.

In a very basic configuration, the portable electronic device 1500 includes, or accesses, components such as at least one control logic circuit, central processing unit, application processor, or processor 1502, and one or more computer-readable media 1504. Each processor 1502 may itself comprise one or more processors or processing cores. For example, the processor 1502 can be implemented as one or more microprocessors, microcomputers, microcontrollers, digital signal processors, central processing units, state machines, logic circuitries, and/or any devices that manipulate signals based on operational instructions. In some cases, the processor 1502 may be one or more hardware processors and/or logic circuits of any suitable type specifically programmed or configured to execute the algorithms and processes described herein. The processor 1502 can be configured to fetch and execute computer-readable instructions stored in the computer-readable media 1504 or other computer-readable media.

Depending on the configuration of the portable electronic device 1500, the computer-readable media 1504 may be an example of tangible non-transitory computer storage media and may include volatile and nonvolatile memory and/or removable and non-removable media implemented in any type of technology for storage of information such as computer-readable instructions, data structures, program modules or other data. The computer-readable media 1504 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the portable electronic device 1500 may access external storage, such as RAID storage systems, storage arrays, network attached storage, storage area networks, cloud storage, or any other medium that can be used to store information and that can be accessed by the processor 1502 directly or through another computing device or network. Accordingly, the computer-readable media 1504 may be computer storage media able to store instructions, modules or components that may be executed by the processor 1502.

The computer-readable media 1504 may be used to store and maintain any number of functional components that are executable by the processor 1502. In some implementations, these functional components comprise instructions or programs that are executable by the processor 1502 and that, when executed, implement operational logic for performing some actions described herein. Functional components of the portable electronic device 1500 stored in the computer-readable media 1504 may include an operating system/user interface module 1506 for controlling and managing various functions of the portable electronic device 1500.

In addition, the computer-readable media 1504 may also store data, data structures and the like, that are used by the functional components. For example, data stored by the computer-readable media 1504 may include user information and, optionally, one or more content items 1508. Depending on the type of the portable electronic device 1500, the computer-readable media 1504 may also optionally include other functional components and data, such as other modules and data 1510, which may include programs, drivers and so forth, and the data used by the functional components. Further, the portable electronic device 1500 may include many other logical, programmatic and physical components, of which those described are merely examples that are related to the discussion herein. Further, while the figures illustrate the functional components and data of the portable electronic device 1500 as being present on the portable electronic device 1500 and executed by the processor 1502 on the portable electronic device 1500, it is to be appreciated that these components and/or data may be distributed across different computing devices and locations in any manner.

FIG. 15 further illustrates other components of the example of the portable electronic device 1500. Such examples include a display 1512 and various types of sensors, which may include a GPS device 1514, an accelerometer 1516, one or more cameras 1518, a compass 1520, a microphone 1522, a gyroscope 1524, and so forth. In accordance with various embodiments, the portable electronic device includes at least four corner cameras located at corners and/or edges of the display 1512.

The portable electronic device 1500 may further include one or more communication interfaces 1526, which may support both wired and wireless connection to various networks, such as cellular networks, radio, Wi-Fi networks, close-range wireless connections, near-field connections, infrared signals, local area networks, wide area networks, the Internet, and so forth. The communication interfaces 1526 may further allow a user to access storage on or through another device, such as a remote computing device, a network attached storage device, cloud storage, or the like.

The portable electronic device 1500 may further be equipped with one or more speakers 1528 and various other input/output (I/O) components 1530. Such I/O components 1530 may include a touchscreen and various user controls (e.g., buttons, a joystick, a keyboard, a keypad, etc.), a haptic or tactile output device, connection ports, physical condition sensors, and so forth. For example, the operating system 1506 of the portable electronic device 1500 may include suitable drivers configured to accept input from a keypad, keyboard, or other user controls and devices included as the I/O components 1530. The display 1512 may be configured as a touchscreen or the portable electronic device 1500 may include a separate touchscreen. The processor 1502 can perform one or more functions attributed to a graphic controller (not illustrated) for the display 1512. Functional components of the portable electronic device 1500 stored in the computer-readable media 1504 may include the user interface module 1506 for controlling and managing various functions of the portable electronic device 1500, and for generating one or more user interfaces on the display 1512 of the portable electronic device 1500. Additionally, the portable electronic device 1500 may include various other components that are not illustrated, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these program modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. A method of locating an object within an image comprising:
   processing, by an application specific integrated circuit (ASIC), an image;
   searching, by the ASIC, the image for presence of an object, wherein the searching comprises:
      generating an integral image of the image; and
      evaluating multiple portions of the integral image with respect to Haar-like features, wherein the evaluating comprises searching each portion of the multiple portions in a plurality of stages until either (i) a stage is failed or (ii) all stages are passed; and
   if all stages are passed indicating the presence of the object in the image, confirming, by the ASIC, the presence of the object.

2. The method of claim 1, if all stages are passed for a first image, the processing, searching and confirming operations are performed for a second image related to the first image to verify the presence of the object, wherein if the presence of the object is verified, the method further comprises determining features of the object and X, Y, Z coordinates of the location of the object, and sending the features and X, Y, Z coordinates to an application processor.

3. The method of claim 1, wherein the searching further comprises downsizing the image so that the object can fit within a search window, and wherein if all stages are passed, the image is repeatedly downsized until a location of the object can be determined.

4. The method of claim 1, wherein the evaluating the multiple portions of the integral image with respect to Haar-like features comprises evaluating at least some of the multiple portions of the integral image simultaneously within multiple sections of a Haar feature evaluation unit.

5. The method of claim 4, wherein the evaluating at least some of the multiple portions of the integral image simultaneously comprises evaluating at least some of the multiple portions of the integral image simultaneously with respect to different Haar-like features, wherein the different Haar-like features are evaluated in different sections of the Haar feature evaluation unit.

6. The method of claim 1, wherein evaluating the search windows of the integral image with respect to Haar features comprises evaluating the search windows of the integral image with respect to one or more of five Haar features.

7. A portable electronic device comprising:
   multiple cameras to capture images; and
   an application specific integrated circuit (ASIC) configured to locate objects within the images, the ASIC comprising:
      a first node configured to process an image;
      a second node configured to search for the presence of an object, wherein the second node comprises:
         an integral image generation unit configured to generate an integral image of the image; and
         a Haar feature evaluation unit configured to evaluate multiple portions of the integral image with respect to Haar-like features, wherein the Haar feature evaluation unit is configured to evaluate each portion of the multiple portions in a plurality of stages until either (i) a stage is failed or (ii) all stages are passed indicating the presence of an object; and
      a third node configured to confirm the presence of the object.

8. The portable electronic device of claim 7, wherein:
the first node is further configured to process two images;
the second node is further configured to search the two images such that if an object is found in a first image of the two images, the second node is configured to search for the object in a second image of the two images; and
the third node is further configured to confirm the presence of the object in the images based upon a location of the object in the first image and a location of the object in the second image.

9. The portable electronic device of claim 7, wherein the first node is configured to process the image by detecting and correcting defective pixels of the images, and by correcting black-levels within the images.

10. The portable electronic device of claim 7, wherein the second node is further configured to downsize the image so that the object can fit within the search window, and wherein if all stages are passed, the image is repeatedly downsized until a location of the object can be determined.

11. The portable electronic device of claim 7, wherein the Haar feature evaluation unit is further configured to evaluate multiple portions of the integral image with respect to one or more of five Haar-like features.

12. The portable electronic device of claim 10, wherein the Haar feature evaluation unit is further configured to evaluate at least some of the multiple portions of the integral image simultaneously within multiple sections of the Haar feature evaluation unit.

13. The portable electronic device of claim 12, wherein the Haar feature evaluation unit is further configured to simultaneously search at least some of the multiple portions of the integral image with respect to different Haar-like features, and wherein the different Haar-like features are evaluated in different sections of the Haar feature evaluation unit.

14. The portable electronic device of claim 7, wherein the Haar evaluation unit comprises a plurality of input ports coupled to a plurality of multiplexers and a plurality of compression modules, wherein the Haar feature evaluation unit is configured to route summed values of the integral image within search windows from the plurality of input ports, through the plurality of multiplexers, and through the plurality of compression modules to create an output value in order to evaluate the search windows of the integral image with respect to a particular Haar-like feature, and wherein the Haar feature evaluation block compares the output value with a threshold to determine if a particular stage is passed.

15. The portable electronic device of claim 14, wherein the Haar feature evaluation unit is further configured to evaluate at least some of the multiple portions of the integral image simultaneously within multiple sections of the Haar feature evaluation unit, and wherein the Haar feature evaluation unit is further configured to simultaneously search the at least some of the multiple portions of the integral image with respect to different Haar-like features, wherein the different Haar-like features are evaluated in different sections of the Haar feature evaluation unit.

16. The portable electronic device of claim 7, wherein the third node is configured to confirm the presence of the object by comparing the integral image of the image with a template.

17. The method of claim 1, wherein the image is a first image, wherein the integral image is a first integral image and wherein the method further comprises:
processing, by an application specific integrated circuit (ASIC), a second image;
searching, by the ASIC, the second image for presence of the object, wherein the searching comprises:
generating a second integral image of the second image; and
evaluating multiple portions of the second integral image with respect to Haar-like features, wherein the evaluating comprises searching each portion of the multiple portions in a plurality of stages until either (i) a stage is failed or (ii) all stages are passed; and
if all stages are passed indicating the presence of the object in the second image, confirming, by the ASIC, the presence of the object in the first and second images.

18. The method of claim 17, wherein the multiple portions of the first integral image and the second integral image are evaluated simultaneously.

19. The method of claim 17, wherein the evaluating multiple portions of the first integral image and the second integral image comprises evaluating multiple search windows of the first integral image and the second integral image simultaneously with respect to multiple Haar-like features, and wherein the evaluating further comprises searching each search window of the multiple search windows of the first integral image and the second integral image in a plurality of stages until either (i) a stage is failed or (ii) all stages are passed.

* * * * *